US011633978B2

(12) United States Patent
Ernenwein et al.

(10) Patent No.: US 11,633,978 B2
(45) Date of Patent: Apr. 25, 2023

(54) HUBCAP FOR HEAVY-DUTY VEHICLES

(71) Applicant: Hendrickson USA, L.L.C., Schaumburg, IL (US)

(72) Inventors: Keith M. Ernenwein, Hudson, OH (US); Jay D. White, North Canton, OH (US); Matthew Gerald Chapman, Canal Fulton, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 458 days.

(21) Appl. No.: 16/877,609

(22) Filed: May 19, 2020

(65) Prior Publication Data

US 2020/0369077 A1    Nov. 26, 2020

Related U.S. Application Data

(60) Provisional application No. 62/851,184, filed on May 22, 2019.

(51) Int. Cl.
*B60B 7/04* (2006.01)
*B60B 7/00* (2006.01)
(Continued)

(52) U.S. Cl.
CPC .............. *B60B 7/04* (2013.01); *B60B 7/0013* (2013.01); *B60B 7/066* (2013.01); *B60B 7/14* (2013.01);
(Continued)

(58) Field of Classification Search
CPC .. B60B 7/04; B60B 7/06; B60B 7/066; B60B 7/0013; B60B 7/14; B60B 2360/102;
(Continued)

(56) References Cited

U.S. PATENT DOCUMENTS 2,657,104 A    5/1951   Kayser
4,121,871 A    10/1978  Adams, Jr.
(Continued)

FOREIGN PATENT DOCUMENTS

EP    1088684 A2    4/2001
EP    1477329 A1    11/2004
(Continued)

*Primary Examiner* — S. Joseph Morano
*Assistant Examiner* — Emily G. Castonguay
(74) *Attorney, Agent, or Firm* — Dureska & Moore, LLC; David P. Dureska; David J. Danko

(57) ABSTRACT

A hubcap for a heavy-duty duty vehicle that includes mounting structure that is formed with and cooperates with a side wall of the hubcap to provide a stiff, rigid structure that enables non-cantilevered connection to a wheel hub. The mounting structure can be a plurality of elongated bosses circumferentially spaced about the side wall that are formed with corresponding elongated bolt openings to enable the non-cantilevered attachment to the wheel hub. The elongated bosses cooperate with the hubcap side wall to provide a stiffened or rigid structure between the elongated bolt openings for increased and more uniform clamping force on a sealing gasket between the hubcap and the wheel hub. The hubcap profile provides clearance for removal of an outboard mounted disc brake rotor in heavy-duty vehicle wheel end assemblies that include such rotor configurations. The hubcap may support simple mounting of a hub odometer.

26 Claims, 19 Drawing Sheets

(51) Int. Cl.
*B60B 7/06* (2006.01)
*B60B 7/14* (2006.01)
*G01C 22/00* (2006.01)

(52) U.S. Cl.
CPC ........ *G01C 22/00* (2013.01); *B60B 2360/102* (2013.01); *B60B 2360/104* (2013.01); *B60B 2900/211* (2013.01); *B60B 2900/212* (2013.01); *B60B 2900/5112* (2013.01); *B60B 2900/5114* (2013.01); *B60B 2900/5118* (2013.01)

(58) Field of Classification Search
CPC ......... B60B 2360/104; B60B 2900/211; B60B 2900/212; B60B 2900/5112; B60B 2900/5114; B60B 2900/5118; G01C 22/00
See application file for complete search history.

(56) References Cited

U.S. PATENT DOCUMENTS

| | | | |
|---|---|---|---|
| 5,090,778 A | 2/1992 | Laudszun et al. | |
| 5,205,617 A | 4/1993 | Hoffmann | |
| 5,328,275 A | 7/1994 | Winn et al. | |
| 5,658,053 A | 8/1997 | Vencill et al. | |
| 9,227,462 B2 | 1/2016 | White et al. | |
| 9,914,326 B2 | 3/2018 | White et al. | |
| 9,933,337 B2 | 4/2018 | White et al. | |
| 2003/0090144 A1 | 5/2003 | Ruspa | |
| 2007/0052283 A1 | 3/2007 | White | |
| 2007/0052284 A1 | 3/2007 | White et al. | |
| 2008/0024003 A1* | 1/2008 | White | F16C 33/6622 184/6 |
| 2011/0062772 A1 | 3/2011 | White | |
| 2014/0152081 A1* | 6/2014 | Leung | B60B 7/0013 301/108.2 |
| 2016/0144659 A1* | 5/2016 | Yu | B60B 7/04 301/108.3 |
| 2018/0154691 A1 | 6/2018 | Andler et al. | |

FOREIGN PATENT DOCUMENTS

| | | |
|---|---|---|
| EP | 3225420 A1 | 10/2017 |
| WO | 2003082647 A2 | 10/2003 |
| WO | 2007030219 A2 | 3/2007 |
| WO | 2014028177 A1 | 2/2014 |
| WO | 2018183037 A1 | 10/2018 |

* cited by examiner

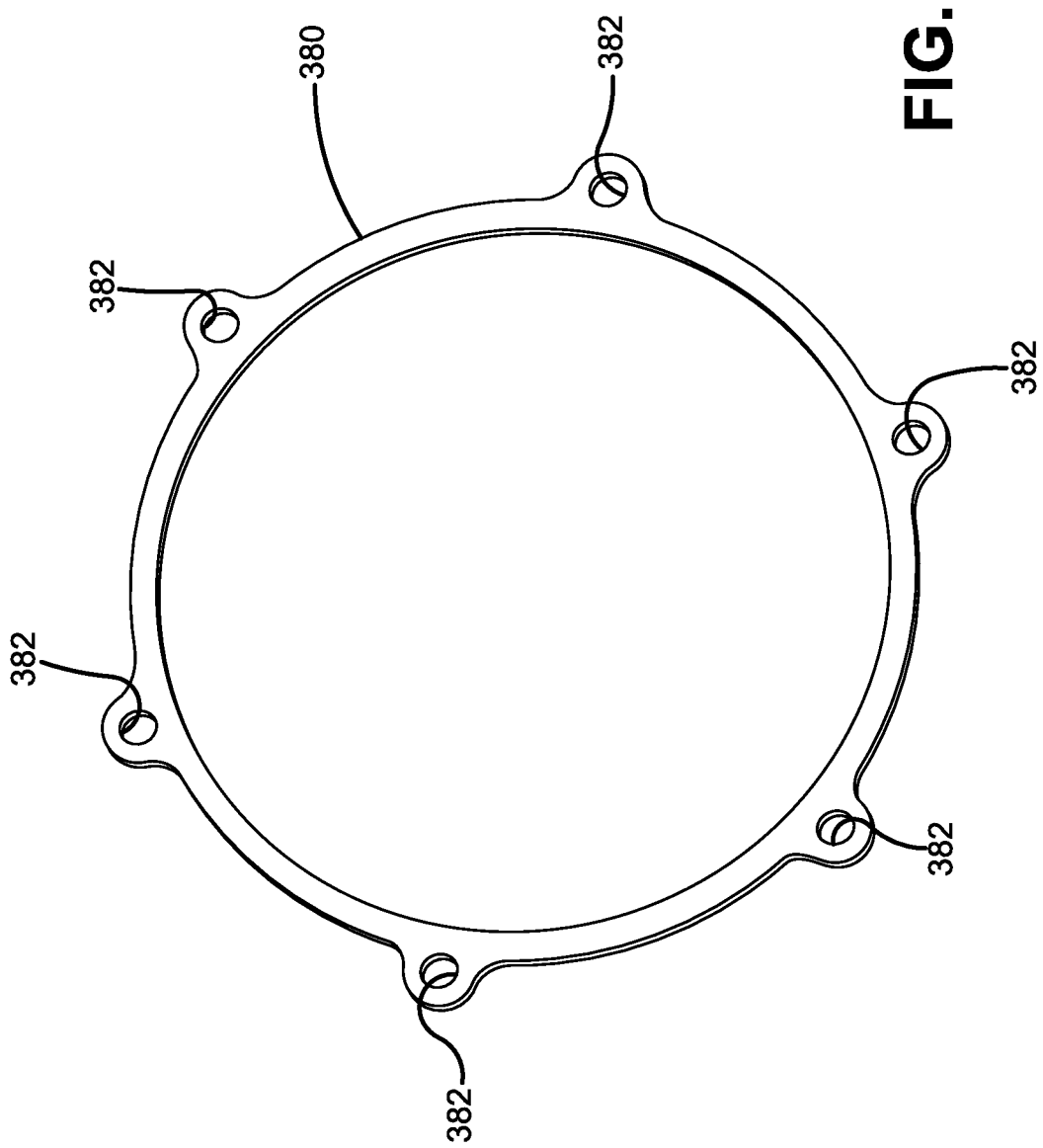

HUBCAP FOR HEAVY-DUTY VEHICLES

CROSS-REFERENCE TO RELATED APPLICATION

This application claims the benefit of U.S. Patent Application Ser. No. 62/851,184, filed May 22, 2019.

BACKGROUND

Technical Field

The disclosed subject matter relates generally to wheel end assemblies for heavy-duty vehicles. More particularly, the disclosed subject matter relates to hubcaps for wheel end assemblies for heavy-duty vehicles. More specifically, the disclosed subject matter is directed to a hubcap for a heavy-duty vehicle that includes a plurality of elongated bosses integrally formed with the hubcap side wall. The elongated bosses are formed with corresponding elongated bolt openings that enable non-cantilevered attachment of the hubcap for a heavy-duty vehicle of the disclosed subject matter to a wheel hub via bolts. The elongated bosses cooperate with the hubcap side wall to provide a stiffened or rigid structure between the elongated bolt openings, which provides increased and more uniform clamping force on a sealing gasket between the hubcap and the wheel hub, thereby providing a better, more uniform seal between the hubcap and the wheel hub to prevent or minimize leakage of lubricant from the wheel end assembly and/or entry of contaminants into the wheel end assembly. In addition, the hubcap of the disclosed subject matter provides clearance for removal of the disc brake rotor in heavy-duty vehicle wheel end assemblies that include outboard mounted disc brake rotor configurations, without requiring the hubcap to be removed prior to removing the outboard mounted disc brake rotor. The hubcap of the disclosed subject matter also supports simple mounting of a hub odometer in a manner that allows removal of a disc brake rotor of an outboard mounted disc brake rotor, without removal of the hubcap and/or hub odometer, as well as includes structure that provides secure attachment of the hub odometer to the hubcap and enables drainage of water and/or other contaminants from between the hub odometer and the hubcap that can potentially be introduced during operation of the heavy-duty vehicle. In addition, the hubcap of the disclosed subject matter allows removal and replacement of the hub odometer without requiring the interior of the hubcap to be exposed, thereby preventing possible entry of contaminants into and/or exit of lubricant from the hubcap, and thus the wheel end assembly.

Background Art

For many years, the heavy-duty vehicle industry has utilized wheel end assemblies mounted on each end of one or more axles. Each wheel end assembly typically includes a wheel hub rotatably mounted on a bearing assembly that is mounted on an outboard end of the axle, commonly known as an axle spindle. The bearing assembly includes an inboard bearing and an outboard bearing, which may be separated by a bearing spacer. An axle spindle nut or lock nut, secures the bearing assembly on the axle spindle, typically by threadably engaging threads that are cut into an exterior surface of the outboard end of the axle spindle. In addition to retaining the position of the bearings and any spacer, the axle spindle nut assembly may be used to preload the bearings, and any bearing spacer, to a predetermined level. A main seal is rotatably mounted on an inboard end of the wheel hub in abutment with the axle spindle, thereby sealing the inboard end of the wheel end assembly.

As is known, for normal operation of the wheel end assembly to occur, the bearing assembly and surrounding components must be well lubricated with grease or oil. Therefore, the wheel end assembly also must be sufficiently sealed on the outboard end to prevent leakage of lubricant and to prevent contaminants from entering the wheel end assembly, both of which could be detrimental to the performance of the wheel end assembly. Generally, such outboard sealing is accomplished by mounting a hubcap on an outboard end of the wheel hub adjacent to and outboard from the axle spindle nut assembly. Prior art hubcaps generally include a cylindrical side wall and an outboard wall perpendicular to and integrally formed with the outboard end of the side wall or a discrete outboard wall sealingly connected to the side wall. A radially-extending flange is typically formed on the inboard end of the side wall and extends perpendicular to the side wall such that it is cantilevered from the side wall. The flange is formed with a plurality of circumferentially-spaced bolt openings to enable bolts to secure the hubcap to the outboard end of a wheel hub. Typically, a discrete gasket formed with a plurality of circumferentially-spaced openings, which align with the openings formed in the hubcap mounting flange, is disposed between the hubcap mounting flange and the outboard surface of the wheel hub for sealing the connection between the hubcap and the wheel hub when the hubcap is tightened down against the wheel hub, as is well known in the art. In this manner, the flange provides cantilevered connection of the hubcap to the wheel hub relative to the side wall of the hubcap.

As mentioned above, the hubcap must provide an effective seal to prevent lubricant from leaking out of the outboard end of the wheel end assembly and/or prevent water and contaminants from entering into the wheel end assembly. In prior art hubcaps, the gasket disposed between the hubcap mounting flange and the outboard surface of the wheel hub is utilized to provide this seal. In order to provide a desirable seal between the hubcap and the wheel hub, uniform compression on the gasket between the hubcap and the wheel hub is generally necessary. However, because of the cantilevered structure of the hubcap mounting flange and the manner in which the flange contacts the outboard end of the wheel hub during fastening, the installation of prior art hubcaps may result in reduced compression on the gasket in the area between adjacent bolt openings in the flange. This reduced gasket compression may result in a non-optimal seal between the hubcap and wheel hub, particularly in the areas of the flange at about the midpoint between the flange openings. Such less than optimal sealing may result in leakage of lubricant out of the wheel hub and/or entry of water or contaminants into the wheel hub.

While most wheel end assemblies include the general features described above, the design and arrangement of the wheel hub, bearing assembly, hubcap, main seal, and other components, vary according to the specific vehicle design and its anticipated uses. For example, some wheel end assemblies include air disc brake assemblies of an air disc brake system attached to/incorporated into the wheel end assembly to provide vehicle braking. Typically, components of the air disc brake assemblies are operatively mounted on the wheel hub and a torque plate attached to the axle. Such air disc brake assemblies operate by using air pressure to force a pair of opposing brake pads toward one another and against a disc of a disc brake rotor, as is known. Friction is created between the brake pads and the disc to slow or stop the vehicle.

The air disc brake assembly generally includes a disc brake rotor. The disc brake rotor typically includes an integrally formed flange that mounts to a wheel hub of a wheel end assembly by mechanical fasteners, such as bolts. A sleeve is integrally formed with, and extends between, a disc portion of the disc brake rotor and the flange. The flange is located at the outboard end of the disc brake rotor. The wheel hub has a mounting flange. The flange of the disc brake rotor is attached to the wheel hub at a location inboard of the mounting flange of the wheel hub. The smallest inner diameter or dimension of the disc brake rotor is less than the largest outer diameter of the wheel hub. Thus, in order to service or replace the disc brake rotor, the wheel hub must be removed from the axle spindle, typically with the disc brake rotor still attached.

Alternatively, the disc brake rotor can include structure that enables the disc brake rotor to be removed from the wheel end for servicing without requiring removal of the wheel hub, which is generally referred to in the art as an outboard mounted disc brake rotor. An example of such an outboard mounted disc brake rotor for a heavy-duty vehicle is shown and described in U.S. Patent Application Publication No. 2018/0340584 of U.S. patent application Ser. No. 15/985,865, assigned to the Applicant of the disclosed subject matter, Hendrickson U.S.A., LLC. Such outboard mounted disc brake rotors typically include a disc segment, a flange or mounting segment, and a substantially cylindrical sleeve segment connecting the disc segment with the mounting segment. Such outboard mounted disc brake rotors are utilized in conjunction with specialized multi-component wheel hubs rotatably mounted on respective axle spindles of an axle of the vehicle. The mounting segment of the outboard mounted disc brake rotor is connected to a discrete flange portion of the wheel hub. A hub portion of the wheel hub is disposed through the sleeve segment of the outboard mounted disc brake rotor and connects to the wheel hub flange portion separately from the flange segment of the disc brake rotor. The wheel hub flange portion in turn is connected to the rotor flange segment, such that the mounting segment of the rotor is at a location outboard of the wheel hub flange portion. A smallest inner dimension of the disc brake rotor is greater than a largest outer dimension of the hub portion of the wheel hub to provide for removal of the rotor without removing the wheel hub from the axle spindle.

In order to provide sufficient clearance for the outboard mounted disc brake rotor to fit over the wheel hub for removal of such outboard mounted disc brake rotors, use of prior art hubcaps that utilize flanges for connecting the hubcap to the wheel hub, such as those described above, is generally not desirable. Specifically, because of the cantilevered outward/radially extending structure of the hubcap flange, removal of the hubcap prior to removal of the outboard mounted disc brake rotor to provide sufficient clearance of the outboard mounted disc brake rotor is generally required, thereby increasing potential for contaminants to be introduced into the wheel hub and/or lubricant to exit the wheel hub, thus increasing maintenance time and costs.

Consequently, hubcaps with alternative structures have been employed with wheel end assemblies featuring outboard mounted disc brake rotors to provide sufficient clearance to enable the rotors to be removed without requiring prior removal of the hubcap. For example, threaded hubcaps that threadably engage corresponding threads formed on the outboard end of the specialized wheel hub have been utilized to provide sufficient clearance of the outboard mounted rotor to enable removal of the rotor from the wheel hub, and thus wheel end assembly, without prior removal of the hubcap. Because such threaded hubcaps rely on friction between the threads of the hubcap and the corresponding threads of the wheel hub to secure the hubcap to the wheel hub, deflection of the hubcap during operation of the vehicle can result in slight loosening of the hubcap threads from the wheel hub threads, potentially compromising the seal between the hubcap and the wheel hub. Consequently, such threaded hubcaps typically employ a sealing element, such as an O-ring, flat gasket, liquid silicon, or flat elastomer coated shim, positioned between the hubcap and the wheel hub to ensure adequate sealing. Because of the clearance required for the axle spindle nut or lock nut within the hubcap, as well as the clearance required for the outboard mounted rotor to fit over the hubcap, there is generally a relatively narrow radial area to position the sealing element between the hubcap and the wheel hub. Because the sealing element is relatively narrow, rotation of the sealing element as the hubcap is threaded against the wheel hub can potentially result in shear that causes the sealing material to tear or be forced radially outwardly from the joint. Thus, the structural limitations of threaded hubcaps utilized with outboard mounted rotors can potentially result in a less than optimal seal between the hubcap and wheel hub, thus potentially allowing water and contaminants to migrate into the wheel end assembly and/or lubricant to exit the wheel end assembly.

Thus, there is a need in the art for a hubcap that provides increased and more uniform clamping force on the gasket between the hubcap and the wheel hub, thereby providing a better, more uniform seal between the hubcap and the wheel hub to prevent or minimize leakage of lubricant from the wheel end assembly and/or entry of contaminants into the wheel end assembly. In addition, there is a need in the art for a hubcap that provides a better, more uniform seal between the hubcap and wheel hub, while providing clearance for removal of a disc brake rotor in heavy-duty vehicle wheel end assemblies that include outboard mounted disc brake rotor configurations. There is also a need in the art for a hubcap that supports simple mounting of a hub odometer in a manner that allows removal of an outboard mounted disc brake rotor, without removal of the hubcap and/or the hub odometer. There is also a need in the art for a hubcap that includes structure that provides secure attachment of the hub odometer to the hubcap and enables drainage of water and/or other contaminants from between the hub odometer and the hubcap that can potentially be introduced during operation of the heavy-duty vehicle. In addition, there is a need in the art for a hubcap that allows removal and replacement of a hub odometer without requiring the interior of the hubcap to be exposed to prevent possible introduction of contaminants into and/or exit of lubricant from the hubcap, and thus the wheel end assembly. The hubcap for a heavy-duty vehicle of the disclosed subject matter satisfies these needs and overcomes the disadvantages of prior art hubcaps, as will be described below.

BRIEF SUMMARY OF THE DISCLOSED SUBJECT MATTER

An objective of the disclosed subject matter is to provide a hubcap for a heavy-duty vehicle with structure that provides increased and more uniform clamping force on a sealing gasket between the hubcap and the wheel hub.

Another objective of the disclosed subject matter is to provide a hubcap for a heavy-duty vehicle with structure that provides a better, more uniform seal between the hubcap and the wheel hub to prevent or minimize leakage of lubricant from the wheel end assembly and/or entry of contaminants into the wheel end assembly.

Yet another objective of the disclosed subject matter is to provide a hubcap for a heavy-duty vehicle that provides clearance for removal of an outboard mounted disc brake rotor in heavy-duty vehicle wheel end assemblies that employ such rotors, without requiring the hubcap to be removed prior to removing the outboard mounted disc brake rotor.

Another objective of the disclosed subject matter is to provide a hubcap for a heavy-duty vehicle that supports simple mounting of a hub odometer in a manner that allows removal of an outboard mounted disc brake rotor, without removal of the hubcap and/or hub odometer.

Yet another objective of the disclosed subject matter is to provide a hubcap for a heavy-duty vehicle that includes structure that provides secure attachment of a hub odometer to the hubcap and enables drainage of water and/or other contaminants from between the hub odometer and the hubcap that can potentially be introduced during operation of the heavy-duty vehicle.

Another objective of the disclosed subject matter is to provide a hubcap for a heavy-duty vehicle that allows removal and replacement of a hub odometer without requiring the interior of the hubcap to be exposed to prevent possible entry of contaminants into and/or exit of lubricant from the hubcap, and thus the wheel end assembly.

These objectives and others are achieved by the hubcap for a heavy-duty vehicle of the disclosed subject matter, which includes: an inboard portion including a side wall, the side wall forming an interior cavity in said base portion; and mounting structure for mounting the hubcap to a wheel hub of the heavy-duty vehicle, the mounting structure cooperating with the side wall to provide non-cantilevered connection to the wheel hub; and an outboard portion, the outboard portion sealing the outboard end of the hubcap.

BRIEF DESCRIPTION OF THE SEVERAL VIEWS OF THE DRAWINGS

A hubcap for a heavy-duty vehicle of the disclosed subject matter, illustrative of the best mode contemplated of applying the principles, is set forth in the following description and is shown in the drawings, in which:

FIG. 8A is a perspective view of the gasket disposed between the exemplary embodiment hubcap and the wheel hub shown in FIG. 8, removed from between the exemplary embodiment hubcap and the wheel hub and showing the structure of the gasket;

Similar numerals refer to similar parts throughout the drawings.

DETAILED DESCRIPTION OF THE DISCLOSED SUBJECT MATTER

Figure 1:
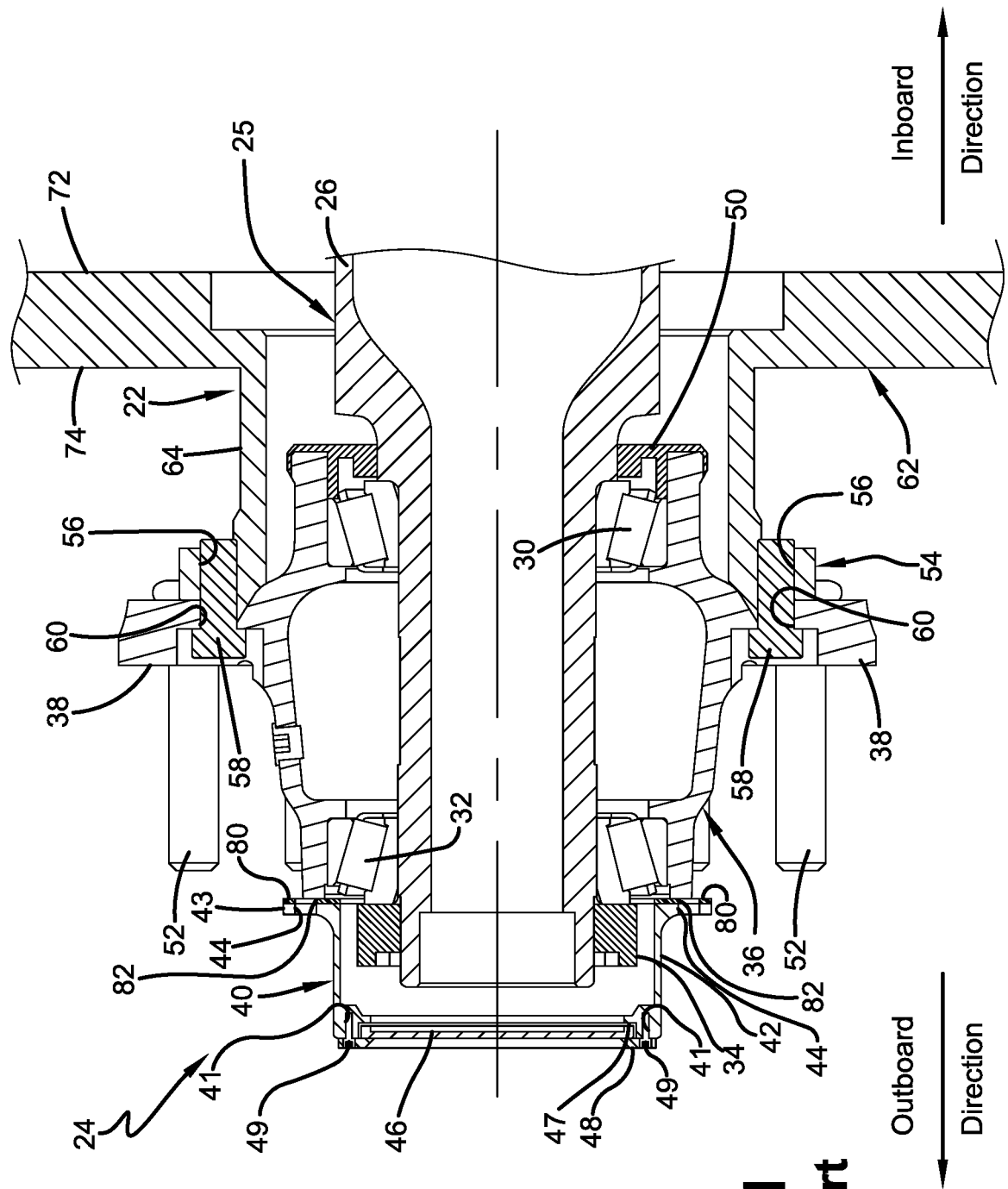
FIG. 1 is a fragmentary cross-sectional view of a wheel end assembly for a heavy-duty vehicle mounted on an axle spindle, which includes a disc brake rotor and a prior art hubcap, each attached to the wheel hub.

In order to better understand the hubcap for a heavy-duty vehicle of the disclosed subject matter and the environment in which it operates, a wheel end assembly for a heavy-duty vehicle incorporating a prior art hubcap 40 is shown in FIG. 1, and is indicated generally at 24. Heavy-duty vehicles include trucks and tractor-trailers or semi-trailers. The tractor-trailers or semi-trailers typically are equipped with one or more trailers. Reference herein shall be made generally to a heavy-duty vehicle for the purpose of convenience, with the understanding that such reference includes trucks, tractor-trailers and semi-trailers, and trailers thereof.

With reference to FIG. 1, a heavy-duty vehicle (not shown) typically includes one or more axles 25 depending from and extending transversely under the vehicle. Each axle 25 has two ends, with a respective wheel end assembly 24 mounted on each one of the ends. For purposes of conciseness and clarity, only one end of axle 25 and its respective wheel end assembly 24 will be described. Axle 25 includes a central tube (not shown). An axle spindle 26 is integrally connected to each respective end of the central tube by any suitable means, such as welding. Wheel end assembly 24 includes a bearing assembly having an inboard bearing 30 and an outboard bearing 32 mounted on axle spindle 26 in a known manner. An axle spindle nut or lock nut 34 threadably engages the outboard end of axle spindle 26 and secures the inboard bearing 30 and outboard bearing 32 in place.

A wheel hub 36 is mounted on inboard bearing 30 and outboard bearing 32 in a known manner for rotation relative to axle spindle 26. Wheel hub 36 includes a radially outward-extending attachment portion 38 about the periphery of the wheel hub. A plurality of threaded studs 52 are attached to respective openings (not shown) formed in attachment portion 38 of wheel hub 36. Threaded studs 52 and respective mating nuts (not shown) are used to mount a wheel rim or a pair of wheel rims (not shown) on wheel end assembly 24. A tire (not shown) is mounted on each wheel rim, as is known. A main continuous seal 50 is mounted on the inboard end of wheel hub 36, and closes and seals the inboard end of wheel end assembly 24.

Wheel end assembly 24 includes a disc brake rotor 22, which is utilized in conjunction with components of a disc brake system (not shown) to provide braking during vehicle operation. Disc brake rotor 22 includes a radially-extending mounting flange 54, which is formed with circumferentially-spaced flange openings 56 that receive mechanical fasteners 58, such as bolts, to connect the disc brake rotor to wheel hub 36. More specifically, wheel hub 36 includes a plurality of openings 60 formed in attachment portion 38 that correspond to flange openings 56 of mounting flange 54 of disc brake rotor 22. Mechanical fasteners 58 pass through openings 60 of attachment portion 38 and threadably engage aligned flange openings 56 of disc brake rotor 22 to removably secure the disc brake rotor to the wheel hub. In this manner, disc brake rotor 22 rotates with wheel hub 36. Because disc brake rotor 22 is mounted to the inboard end of wheel hub 36, the disc brake rotor is only removable for servicing when wheel hub 36, with or without the disc brake rotor attached, is also removed from axle spindle 26.

Disc brake rotor 22 also includes a radially-extending disc 62. Disc 62 is operatively disposed between a pair of opposing brake pads (not shown) of an air disc brake assembly (not shown) of the disc brake system, as is known. An axially-extending rotor sleeve 64 is integrally formed with and extends between disc 62 and radially-extending mounting flange 54 and connects the disc to the mounting flange. Disc 62 of disc brake rotor 22 includes an inboard surface 72 and an outboard surface 74. Inboard surface 72 is adjacent the friction material of a respective one of a pair of brake pads (not shown), and outboard surface 74 is adjacent to the friction material of the other one of the pair of brake pads. Together, contact of the brake pads against outboard surface 74 and inboard surface 72 of disc 62, slows and/or stops rotation of wheel hub 36, and thus the vehicle wheel.

Figure 2:
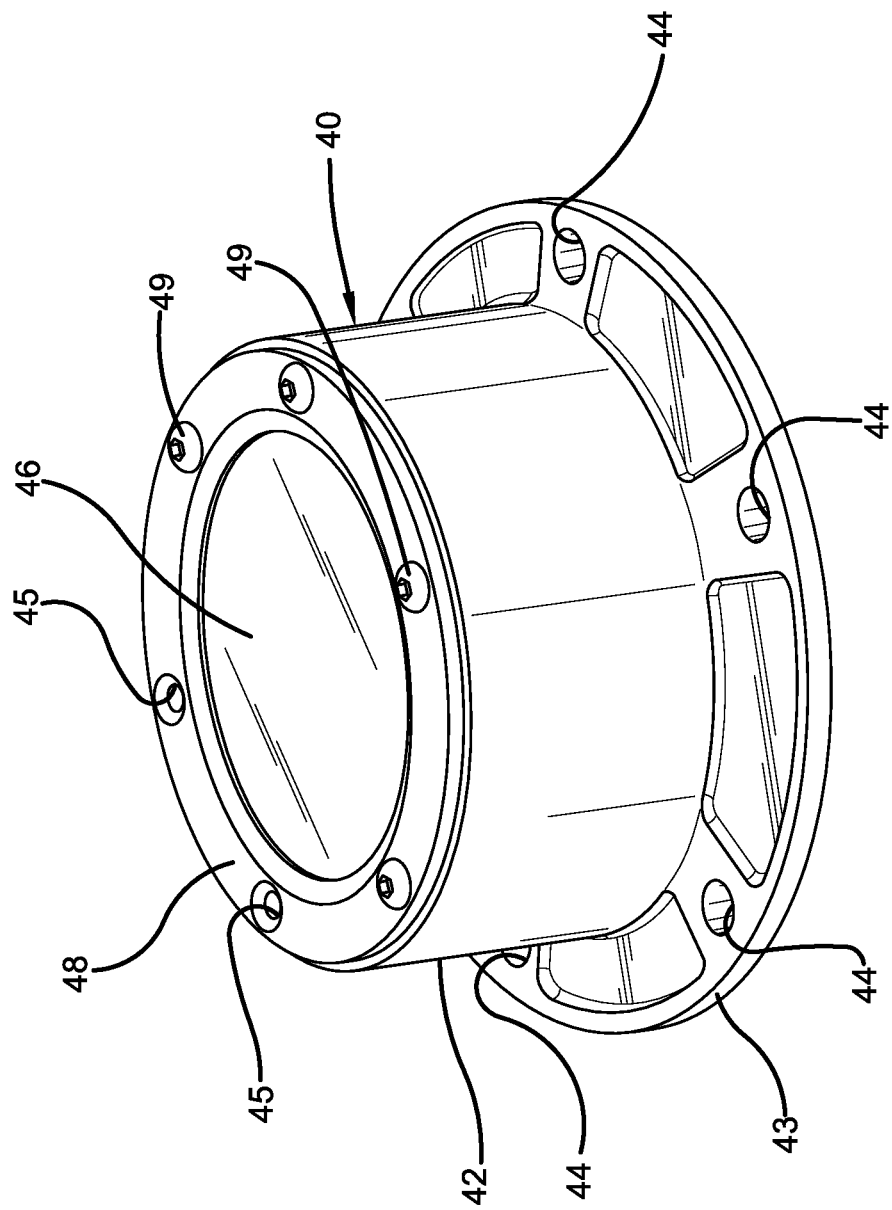
FIG. 2 is an enlarged exterior perspective view of the prior art hubcap shown in FIG. 1.
Figure 3:
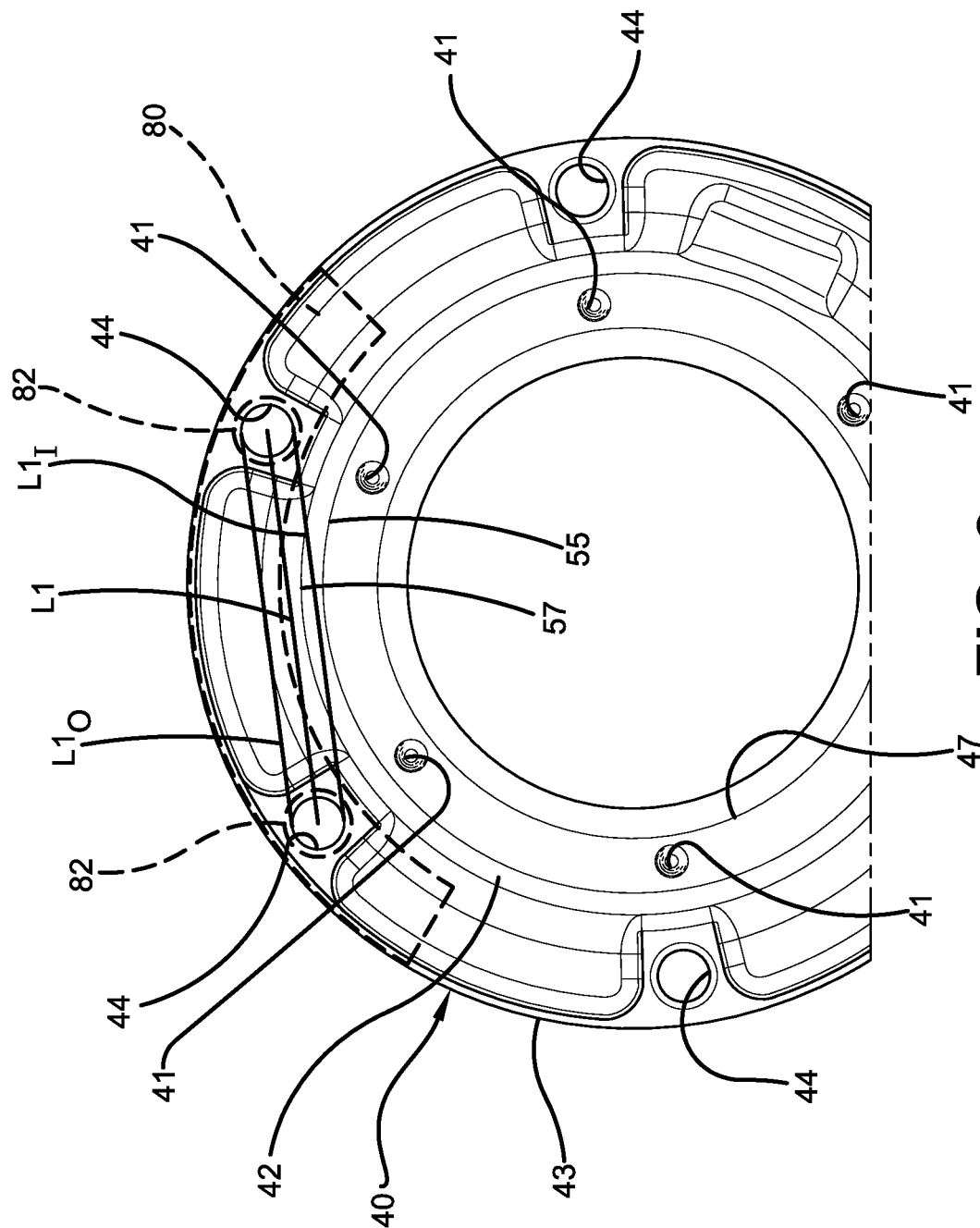
FIG. 3 is a fragmentary elevational view of the prior art hubcap shown in FIG. 1, with the outboard wall removed, and looking in an inboard direction, showing the orientation of a plurality of illustrative lines passing through and tangential to adjacent flange openings and relative to the sealing portion of the prior art hubcap, with a hidden portion of a gasket shown in phantom lines.

With reference to FIGS. 1-3, wheel end assembly 24 also includes prior art hubcap 40. Hubcap 40 is cast from a suitable material, such as aluminum. Hubcap 40 includes a cylindrical side wall 42. A radially-extending flange 43 is integrally formed with the inboard end of side wall 42, such that it extends cantilevered from the side wall inboard end. Radially-extending flange 43 is formed with a plurality of bolt openings 44 through which a plurality of bolts (not shown) are disposed to secure hubcap 40 to the outboard end of wheel hub 36. More specifically, each one of the plurality of bolts passes through a respective one of plurality of bolt openings 44, and threadably engages a respective one of a plurality of aligned threaded openings (not shown) formed in the outboard end of wheel hub 36, with the outboard end of the wheel hub extending arcuately with flange 43 between adjacent bolt openings. With reference to FIGS. 1 and 3, a gasket 80 formed with openings 82, which correspond to bolt openings 44 of flange 43 and the openings formed in the outboard end of wheel hub 36, is typically disposed between the flange and the outboard end of the wheel hub to provide sealing between hubcap 40 and the wheel hub, as is known. The shape of gasket 80 substantially corresponds to that of the inboard surface of flange 43.

With reference to FIGS. 1-2, prior art hubcap 40 also includes a discrete outboard wall 46. Outboard wall 46 of hubcap 40 seats in a circumferentially-extending recessed surface 47 (FIGS. 1 and 3) formed adjacent to the outboard end of side wall 42, such that the outboard surface of the outboard wall is coplanar with the outboard end of the side wall. An O-ring (not shown) is disposed between outboard wall 46 and recessed surface 47 to provide a seal between the outboard wall and the recessed surface. Outboard wall 46 is typically tinted, transparent, or translucent to enable visual inspection of lubricant levels within wheel end assembly 24. Alternatively, when semi-fluid grease is utilized to lubricate components within wheel end assembly 24, outboard wall 46 is typically opaque or a solid aluminum cap, as visual inspection of grease amounts within the wheel end assembly is generally not necessary.

With continued reference to FIGS. 1-2, prior art hubcap 40 includes a retaining ring 48 positioned over a gasket (not shown), which in turn is positioned over the coplanar junction between the outboard surface of outboard wall 46 and the outboard end of side wall 42. Retaining ring 48 is formed with plurality of circumferentially spaced openings 45, which extend through the retaining ring and are circumferentially aligned with a plurality of openings formed in the gasket and a plurality of circumferentially spaced openings 41 (FIGS. 1 and 3) formed in the outboard end of side wall 42. Openings 41 formed in the outboard end of side wall 42 extend inboardly partially into the side wall. A plurality of screws 49 or other suitable mechanical fasteners extend through respective aligned openings 45 of retaining ring 48, the plurality of openings of the gasket, and into side wall openings 41 to capture and secure outboard wall 46 of hubcap 40 within recessed surface 47 between the retaining ring and the recessed surface. In this manner, hubcap 40 closes and seals the outboard end of wheel end assembly 24.

While prior art hubcap 40 is generally suitable for its intended purpose, the mounting configuration of the prior art hubcap can potentially provide uneven and undesirable clamping force on gasket 80 between the prior art hubcap and wheel hub 36 when the hubcap is attached to the wheel hub in the manner described above. More specifically, because of the cantilevered configuration of flange 43 relative to the inboard end of side wall 42 of hubcap 40, uneven and undesirable clamping force can be directed on gasket 80 disposed between the flange and the outboard end of wheel hub 36, particularly in the areas of the gasket around the midpoint between adjacent bolt openings 44 of the flange. This is because peak clamping force is generally localized in the area extending linearly between adjacent bolts, with the greatest clamping force being exhibited in the midline of the area. With reference to FIG. 3, the area of peak clamping force is between an outer line $L1_O$ and an inner line $L1_I$ tangential to and extending between adjacent bolt openings 44, with the greatest clamping force being exhibited in the area along a line L1. Because a radially inner edge 55 of side wall 42 is located radially inwardly of inner line $L1_I$ and a radially outer edge 57 of the side wall is entirely located radially inwardly of line L1 between adjacent bolt openings 44, flange 43 is cantilevered in the area adjacent line L1 and can experience deflection between the bolt openings upon clamping to the outboard end of wheel hub 36 via the fasteners. Moreover, because the outboard end of wheel hub 36 extends arcuately between adjacent bolt openings 44 of flange 43, the clamping surface of gasket 80 on the wheel hub outboard end around the midpoint between the adjacent bolt openings is radially outwardly offset from line L1. Due to the orientation of the clamping surface of gasket 80 on the outboard end of wheel hub 36 between adjacent bolt openings 44 of flange 43 relative to line L1, as well as potential deflection of the flange between the bolt openings by nature of the cantilevered structure of the flange, undesirable clamping force may be exhibited in these areas. Such uneven and undesirable clamping may potentially result in a non-optimal seal between flange 43 and the outboard end of wheel hub 36, and thus a less than optimal seal between hubcap 40 and the wheel hub, which can potentially result in leakage of lubricant out of the wheel hub and/or entry of water or contaminants into the wheel hub.

In addition, because flange 43 of prior art hubcap 40 extends radially from and is cantilevered relative to the inboard end of side wall 42, the hubcap does not provide sufficient clearance for removal of an outboard mounted disc brake rotor in wheel end assemblies that employ such rotors. Thus, hubcap 40 must first be removed prior to removing the outboard mounted rotor, including any attached accessories, such as a hub odometer, thereby increasing potential for contaminants to be introduced into the wheel hub and/or lubricant to escape the wheel hub, and increasing maintenance time and costs when the prior art hubcap is utilized in such wheel end assemblies.

In order to further better understand the hubcap for a heavy-duty vehicle of the disclosed subject matter and the environment in which it operates, a wheel end assembly for heavy-duty vehicles which accommodates mounting of an outboard mounted rotor is shown in FIGS. 4-7, and is indicated at 100. Wheel end assembly 100 employs a two-piece wheel hub 101 that includes a hub portion 102 and a discrete flange portion 106, which enable an outboard mounted disc brake rotor 104 to be attached for removal, without requiring removal of the entire wheel hub from the wheel end assembly.

Figure 6:
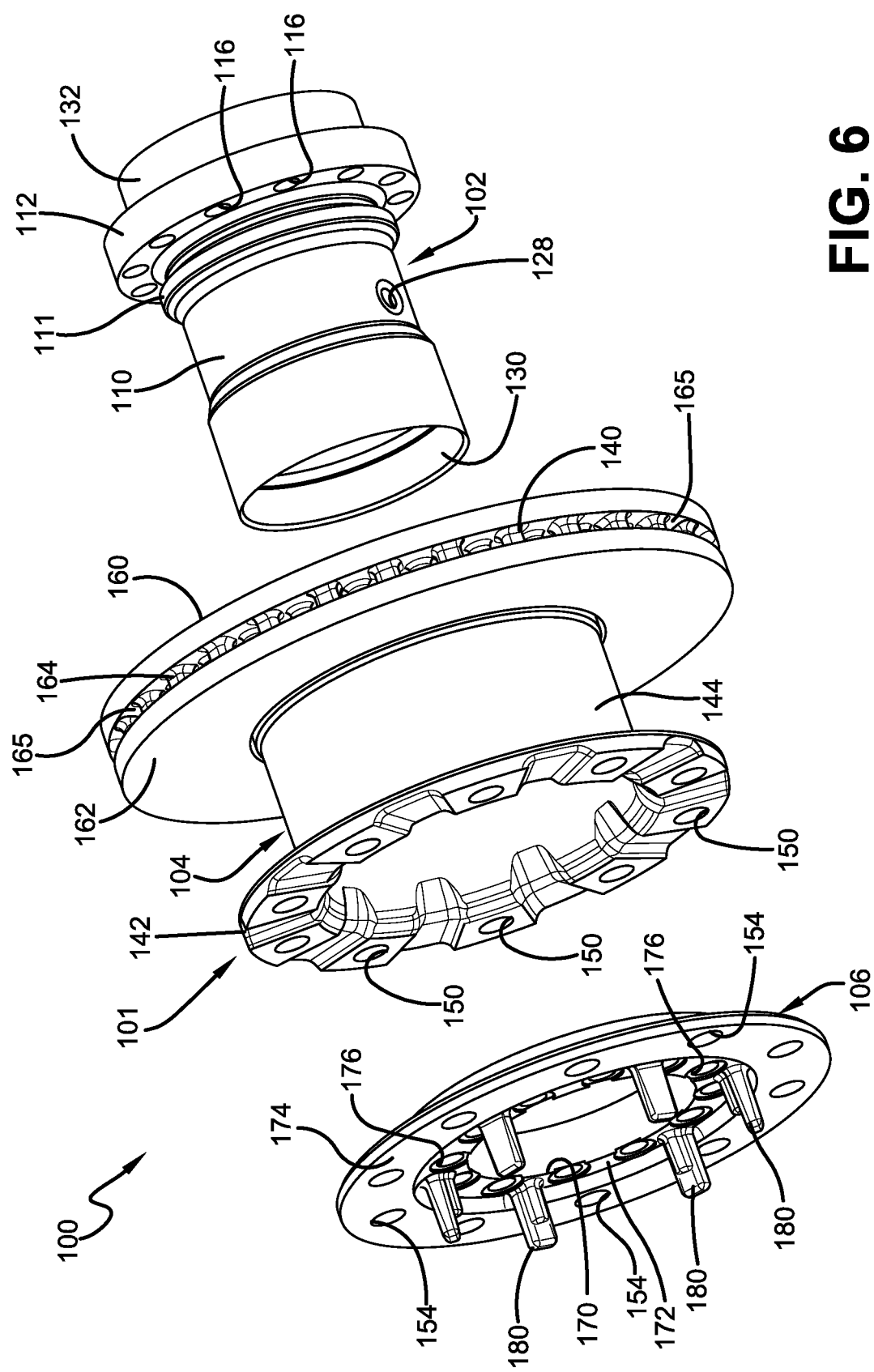
FIG. 6 is an exploded perspective view of the wheel end assembly shown in FIG. 4.
Figure 7:
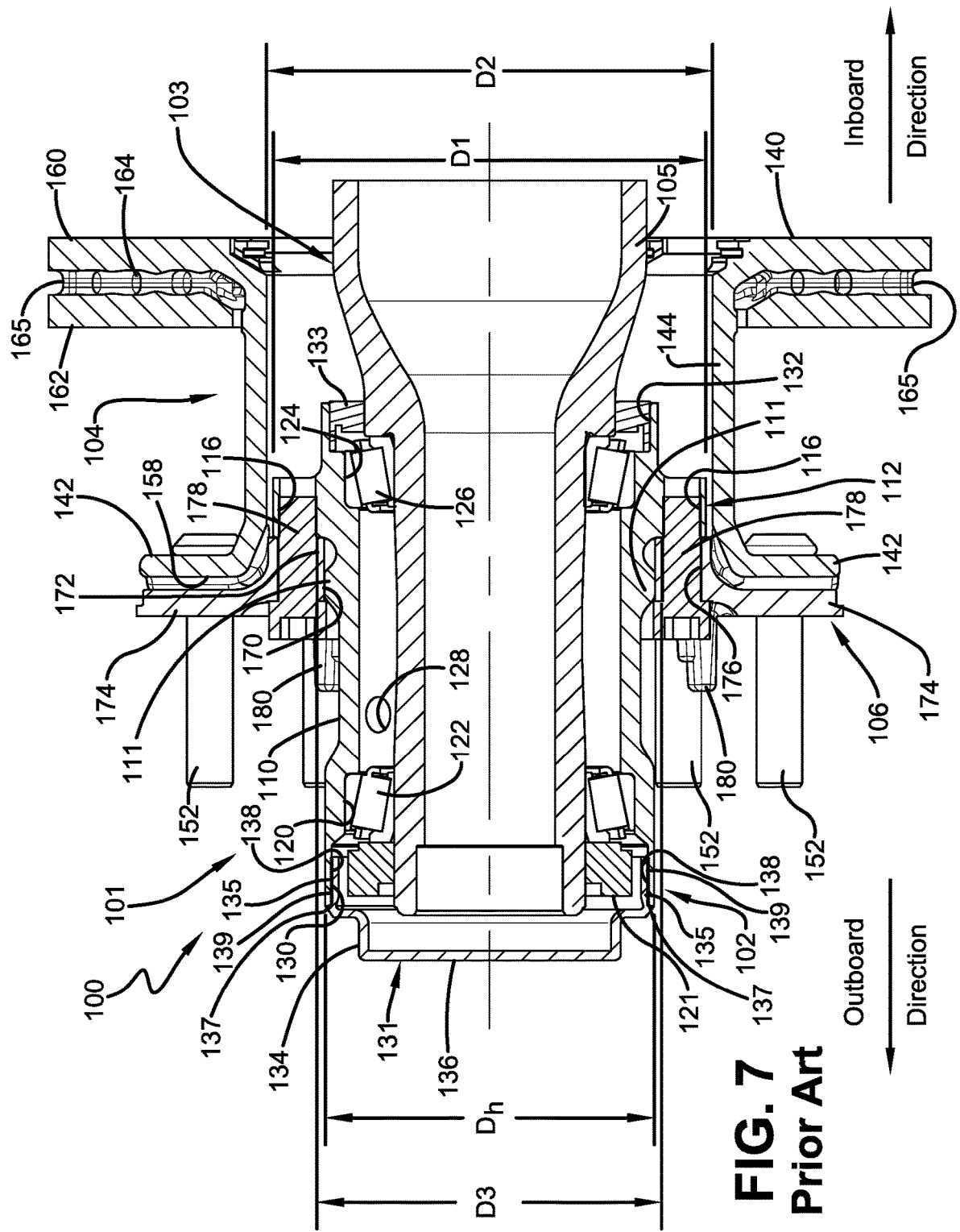
FIG. 7 is a fragmentary cross-sectional view of the wheel end assembly shown in FIG. 4, shown with the hubcap attached to the wheel hub and showing the wheel end assembly mounted on an axle spindle.

Hub portion 102 of wheel hub 101 includes a substantially cylindrical body 110 and a radially outward-extending flange mounting section 112 (FIGS. 6-7) integrally formed with the body. Hub portion 102 has an outer dimension or diameter D1 (FIG. 7) taken across flange mounting section 112, which is the diameter of the largest part of the hub portion. Flange mounting section 112 includes a plurality of threaded openings 116 (FIGS. 6-7) that may be arranged in an evenly spaced circumferential array. Flange mounting section 112 of hub portion 102 is connectable with flange portion 106 of wheel hub 101. With reference to FIG. 7, hub portion 102 is rotatably mounted on an outboard bearing 122 and an inboard bearing 126 disposed on an axle spindle 105 of an axle 103 of the heavy-duty vehicle and secured thereto via a lock nut 121, in a known manner. More specifically, hub portion 102 includes an annular cavity 120 (FIG. 7) in one end segment for receiving outboard bearing 122 (FIG. 7). Hub portion 102 also includes an annular cavity 124 in an axially opposite end segment for receiving inboard bearing 126. A fill port opening 128 (FIGS. 6-7) is provided in body 110 of hub portion 102, which allows lubricant to be introduced into the interior of the hub portion. An inboard end section 132 (FIGS. 6-7) of hub portion 102 includes a main wheel seal 133 disposed therein, which closes the inboard end of the hub portion, and thus the inboard end of wheel end assembly 100. An outboard end section 130 of hub portion 102 adjacent annular cavity 120 is internally threaded, the purpose of which will be described below.

With reference to FIGS. 4-7, outboard mounted disc brake rotor 104 of wheel end assembly 100 includes a radially-extending disc segment 140, a radially-extending flange or mounting segment 142 (FIGS. 5-7), and an axially-extending sleeve segment 144 rigidly connecting the disc segment and the mounting segment. Disc segment 140, mounting segment 142 and sleeve segment 144 are typically integrally formed by casting as one-piece. Sleeve segment 144 is substantially cylindrical over its entire axial extent. Disc brake rotor 104 of wheel end assembly 100 is connected with the hub portion 102 via flange portion 106. In this manner, all components forming disc brake rotor 104 are rotatable as a unit about axle spindle 105 of axle 103, as will be described in detail below.

Disc segment 140 of outboard mounted disc brake rotor 104 includes an inboard disc 160 and an outboard disc 162. Inboard disc 160 and outboard disc 162 are spaced apart from one another and are interconnected by a plurality of integrally formed vanes, posts or pins 164, collectively referred to herein as "pins". Pins 164 are structural members that extend axially between inboard disc 160 and outboard disc 162 to provide a rigid connection between the inboard and outboard discs. Pins 164 cooperate with inboard disc 160 and outboard disc 162 to form radial passages 165 therebetween, which assist in allowing or creating cooling fluid flow through disc segment 140 of disc brake rotor 104. The disc segment 140 of disc brake rotor 104 is disposed between a pair of opposing brake pads (not shown) in a known manner, which slow or stop rotation of the disc brake rotor 104, and thus wheel hub 101, when the brake pads are forced against respective inboard disc 160 and outboard disc 162 of the disc segment.

Figures 4, 5:
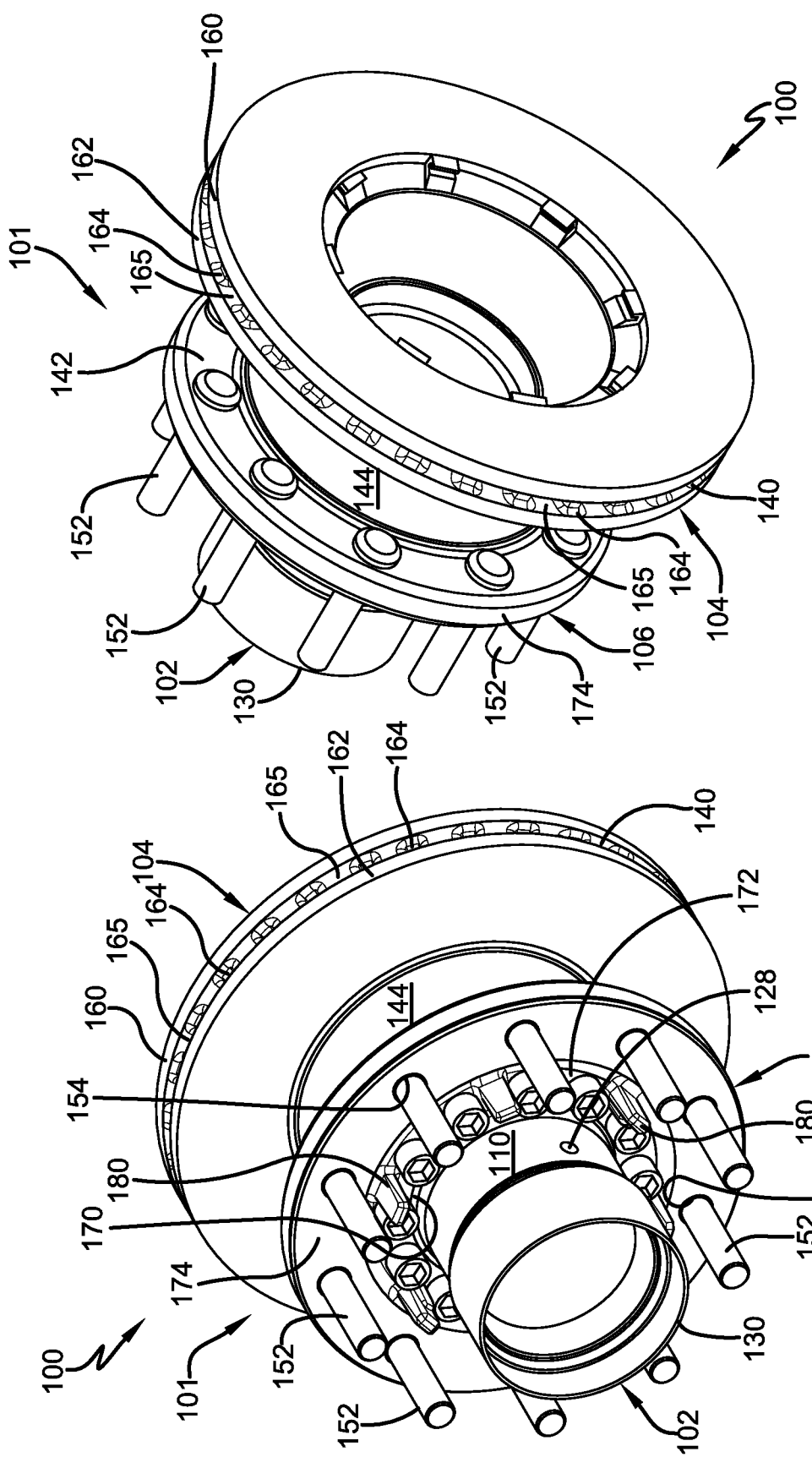
FIG. 4 is a perspective view of a wheel end assembly which includes an outboard mounted disc brake rotor attached to a specialized multi-component wheel hub, viewed looking in an inboard direction, and shown with the hubcap removed.
FIG. 5 is a perspective view of the wheel end assembly shown in FIG. 4, viewed looking in an outboard direction.

Mounting segment 142 of disc brake rotor 104 is formed with a plurality of circumferentially arrayed openings 150 (FIG. 6) to receive a plurality of mechanical fasteners 152 (FIGS. 4-5 and 7), such as wheel studs. Mechanical fasteners 152 assist in centering and connecting disc brake rotor 104 with flange portion 106 of wheel hub 101 and to attach a wheel rim (not shown) to wheel end assembly 100. With reference to FIGS. 4 and 6, the mechanical fasteners 152 extend through openings 150 in mounting segment 142 of disc brake rotor 104 and through coaxially-aligned openings 154 formed in a radially and circumferentially-extending attachment section 174 of flange portion 106 of wheel hub 101. Nuts (not shown) are tightened on mechanical fasteners 152 and against the wheel rim, which also forces the flange portion 106 against mounting segment 142 of disc brake rotor 104.

Sleeve segment 144 of disc brake rotor 104 is formed with an inner surface and an outer surface that are concentric and substantially cylindrical between disc segment 140 and mounting segment 142. Sleeve segment 144 of disc brake rotor 104 has an inner dimension or diameter D2 (FIG. 7) that is the smallest dimension of the disc brake rotor. The inner dimension or diameter D2 is greater than a largest outer dimension or diameter D1 of hub portion 102 of wheel hub 101. Thus, disc brake rotor 104 may be removed axially outboardly from hub portion 102 of wheel hub 101 without removing or detaching the hub portion from axle spindle 105, as will be described in greater detail below.

As indicated above, wheel hub 101 includes flange portion 106 (FIGS. 4-7). Flange portion 106 is connectable with, and positioned between, hub portion 102 and disc brake rotor 104. Flange portion 106 is removable from hub portion 102 with or without disc brake rotor 104 attached. More specifically, and with reference to FIGS. 4-7, flange portion 106 is a substantially annular shaped structural member that includes a main central section 172 extending radially inwardly from attachment section 174. Main central section 172 includes a plurality of pilots 180, which assist in aligning and mounting the wheel rim. Main central section 172 is formed with a central and circular opening 170 (FIGS. 4 and 6-7) through which part of hub portion 102 extends. Opening 170 in main central section 172 has a diameter D3 that closely or tightly fits over a flange mounting pilot 111 (FIGS. 6-7) of hub portion 102. Main central section 172 axially engages the outboard surface of flange mounting section 112 of hub portion 102.

Main central section 172 of flange portion 106 has a plurality of openings 176, which extend axially through the main central section (FIG. 6). Each of openings 176 receives a respective fastener 178 (FIG. 7) that is threaded into a respective threaded opening 116 in flange mounting section 112 of the hub portion 102. Each of fasteners 178 is tightened against main central section 172 to rigidly fasten, with a sufficient clamping force, the flange portion 106 of wheel hub 101 to flange mounting section 112 of hub portion 102 of the wheel hub.

The largest dimension or diameter D1 of hub portion 102 is less than the smallest inner dimension or diameter D2 of disc brake rotor 104. Thus, hub portion 102 also can be removed from axle spindle 105 of axle 103 without removing the disc brake rotor 104 or a brake caliper/carrier assembly (not shown) from its mounting structure. Flange portion 106 is first detached from disc brake rotor 104. Flange portion 106 and hub portion 102 can then be removed from axle spindle 105 as a unit. Flange portion 106 may be detached from hub portion 102 to better access the hub portion for servicing. Alternately, flange portion 106 may be detached from hub portion 102 prior to removing the hub portion from axle spindle 105.

With reference to FIG. 7, wheel end assembly 100 includes a prior art hubcap 131, which is utilized to close and seal the outboard end of wheel hub 101, and thus wheel end assembly 100. Hubcap 131 generally includes an outboard wall 136 integrally formed with a hexagonal side wall 134 or a side wall with other suitable shapes. An externally threaded segment 135 is integrally formed with side wall 134 and extends axially inboard from the side wall. Externally threaded segment 135 includes external threads 139 that threadably engage internal threads 138 formed in outboard end section 130 of hub portion 102 of wheel hub 101. In this manner, prior art hubcap 130 is secured to wheel hub 101, and thus closes the outboard end of the wheel hub. Because hubcap 131 utilizes threaded engagement to attach the hubcap to wheel hub 101 and does not utilize cantilevered structure to mount the hubcap to the wheel hub, such as flange 43 of prior art hubcap 40 described above, the diameter of the hubcap $D_h$ (FIG. 7) is less than diameter D1 of disc brake rotor 104 and diameter D3 of opening 170 in main central section 172 of flange portion 106 of wheel hub 101. Thus, hubcap 131 provides clearance for flange portion 106 of wheel hub 101 and attached disc brake rotor 104 so the flange and disk brake rotor can be removed from wheel end assembly 100 without requiring the hubcap to be removed from the wheel hub.

While prior art hubcap 131 is generally suitable for its intended purpose, the structural limitations of the hubcap required to enable removal of outboard mounted disc brake rotor 104 without removal of the hubcap can potentially result in a less than optimal seal between the hubcap and wheel hub 101. More specifically, hubcap 131 relies on friction between external threads 139 of externally threaded segment 135 and internal threads 138 of outboard end section 130 of hub portion 102 of wheel hub 101 to secure the hubcap to the wheel hub. Deflection of wheel hub 101 and/or hubcap 131 during operation of the vehicle can result in loosening of external threads 139 of externally threaded segment 135 of hubcap 131 and internal threads 138 of outboard end portion 130 of the wheel hub. Consequently, hubcap 131 employs a sealing element 137 (FIG. 7), such as an O-ring, flat gasket, liquid silicon, or flat elastomer coated shim, positioned between the inboard end of cylindrical side wall 134 and the outboard end of outboard end section 130 of hub portion 102 of wheel hub 101 to attempt to ensure adequate sealing. Because of the clearance required for lock nut 121 within hubcap 131, as well as the clearance required for flange portion 106 of wheel hub 101 and outboard mounted disc brake rotor 104 to fit over the hubcap, there is generally a relatively narrow radial area to position sealing element 137 between the inboard end of cylindrical side wall 134 and the outboard end of outboard end section 130 of hub portion 102 of wheel hub 101. Because sealing element 137 is relatively narrow, rotation of the sealing element as hubcap 131 is threaded against wheel hub 101 can potentially result in shear that causes the sealing element to tear or be forced radially outwardly of the joint between the hubcap and wheel hub, potentially resulting in a non-optimal seal. This less than optimal seal in turn can potentially allow water and contaminants to migrate into wheel end assembly 100 and/or allow lubricant to escape out of the wheel end assembly, which in turn can potentially damage components within the wheel end assembly and result in increased maintenance costs and vehicle downtime.

The hubcap for a heavy-duty vehicle of the disclosed subject matter overcomes the deficiencies of prior art hubcaps, such as prior art hubcaps 40 and 131, and will now be described. An exemplary embodiment hubcap for a heavy-duty vehicle of the disclosed subject matter utilized with a wheel end assembly 200 is shown in FIGS. 8-11 and is indicated generally at 300. Wheel end assembly is similar in structure and function to wheel end assembly 100 described above, except that components of wheel end assembly 200 are modified to accommodate mounting of exemplary embodiment hubcap 300, as will be described in greater detail below.

Figure 8:
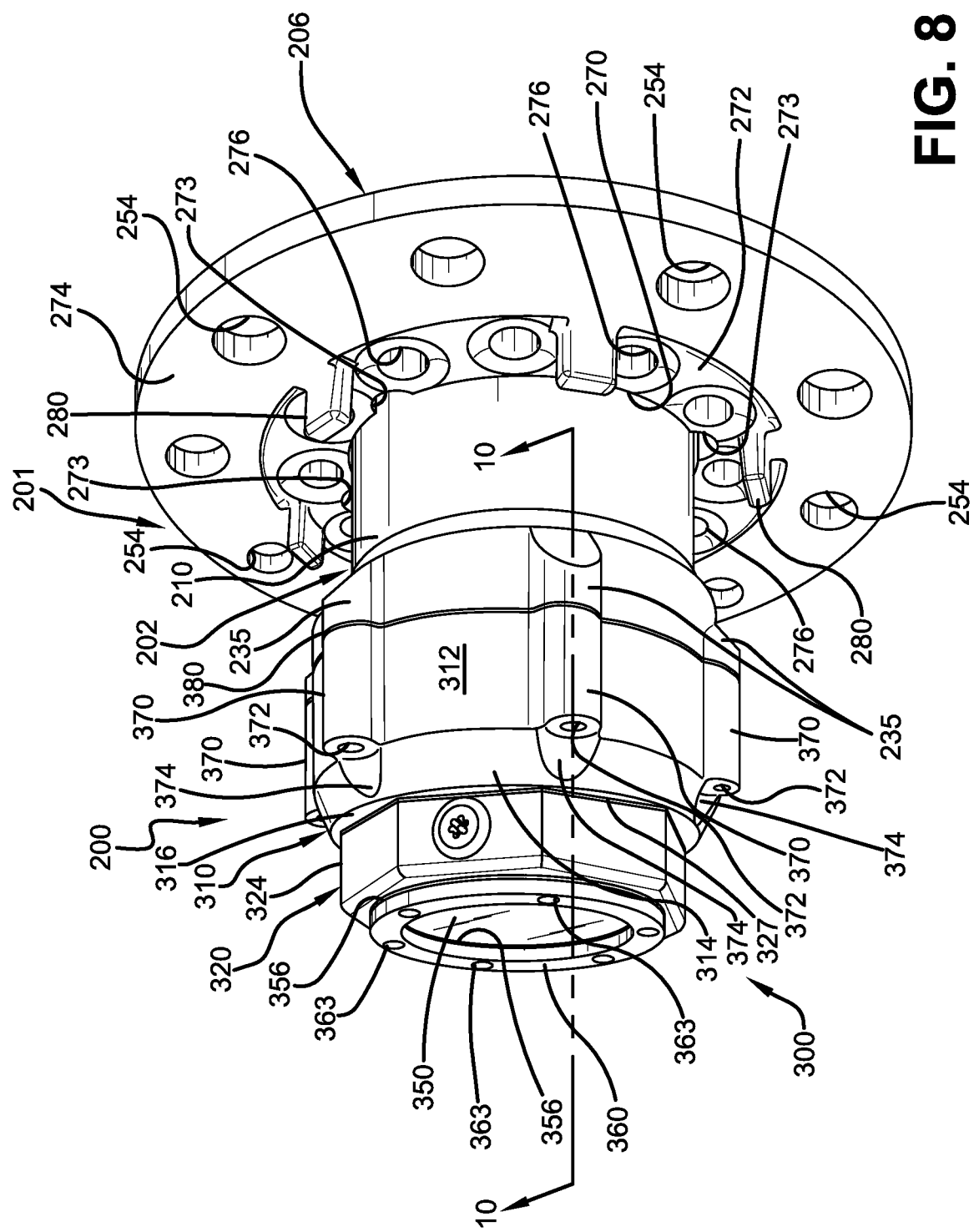
FIG. 8 is a perspective view of a wheel end assembly, including an exemplary embodiment hubcap of the disclosed subject matter disposed on a wheel hub capable of accommodating mounting of an outboard mounted disc brake rotor, and modified to accommodate mounting of the exemplary embodiment hubcap.
Figure 10:
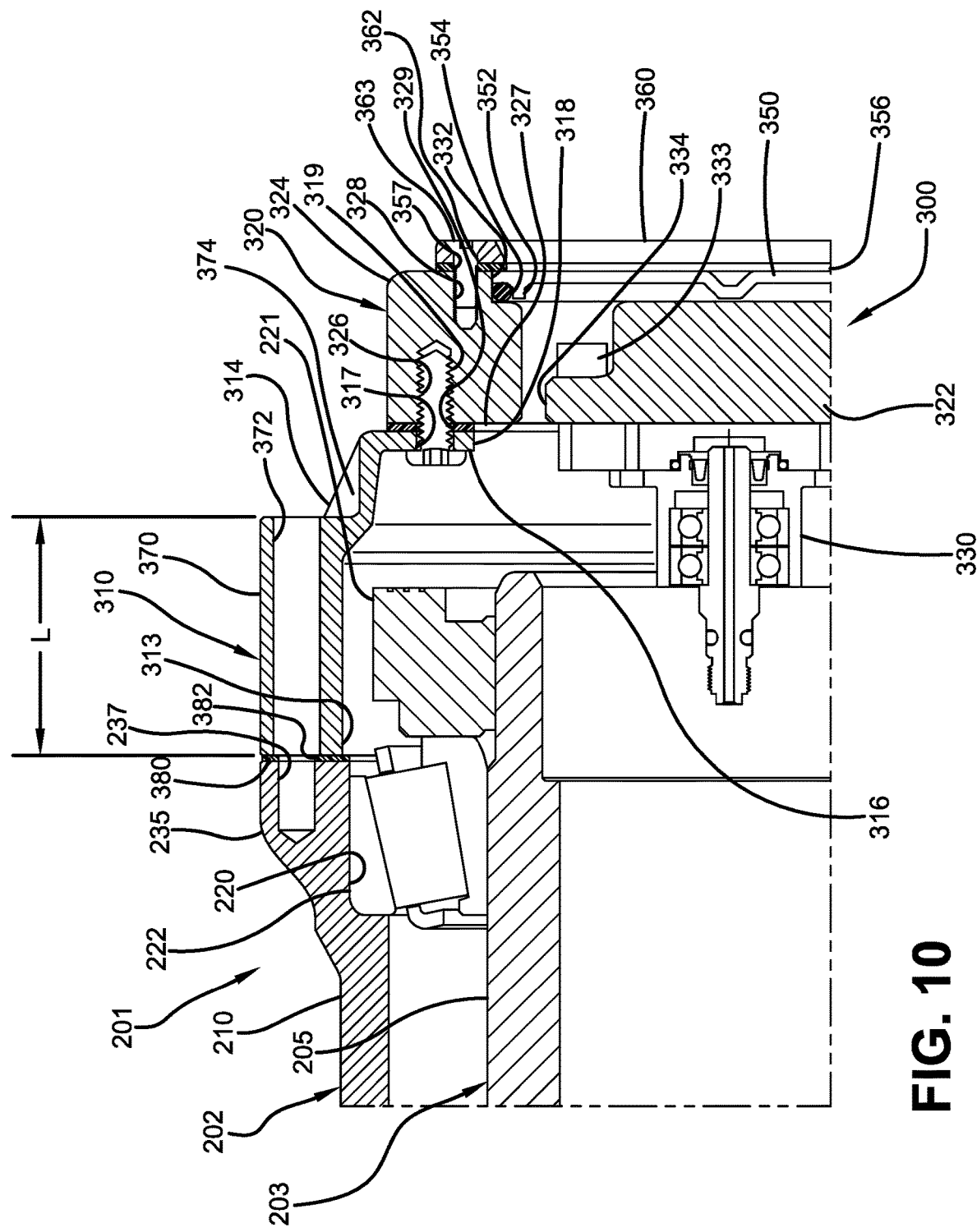
FIG. 10 is a fragmentary cross-sectional view of a portion of the exemplary embodiment hubcap and wheel hub shown in FIG. 8, taken along line 10-10.

With reference to FIGS. 8 and 10, wheel end assembly 200 employs a two-piece wheel hub 201 that enables mounting of an outboard mounted disc brake rotor (not shown), such as disc brake rotor 104 described above (FIGS. 4-7). Wheel hub 201 is similar in structure and function to wheel hub 101 described above (FIGS. 4-7) and generally includes a hub portion 202 and a discrete flange portion 206.

Hub portion 202 of wheel hub 201 includes a substantially cylindrical body 210 and a radially outward-extending flange mounting section (not shown) integrally formed with the body. The flange mounting section includes a plurality of openings (not shown) that are arranged in an evenly spaced circumferential array. The flange mounting section of hub portion 202 is connectable with flange portion 206 of wheel hub 201 via suitable fasteners (not shown), such as bolts, as will be described in greater detail below. With reference to FIG. 10, hub portion 202 is rotatably mounted on an outboard bearing 222 and an inboard bearing (not shown) disposed on an axle spindle 205 of an axle 203, and is secured thereon via a lock nut 221 in a known manner. More specifically, hub portion 202 includes an annular cavity 220 in an outboard end of cylindrical body 210 for receiving outboard bearing 222. Hub portion 202 also includes a second annular cavity (not shown) in an inboard end of cylindrical body 210 for receiving the inboard bearing.

Hub portion 202 is modified to enable attachment of exemplary embodiment hubcap 300. More specifically, and with reference to FIGS. 8 and 10, a plurality of circumferentially spaced bosses 235 are formed about the outboard end of cylindrical body 210 of hub portion 202. Each one of bosses 235 is formed with a threaded opening 237 extending axially inboardly into the boss. Each threaded opening 237 preferably provides at least 0.410 inch of thread engagement, but could include less than or greater than 0.410 inch of thread engagement in certain configurations of hub portion 202 of wheel hub 201 without affecting suitable attachment of exemplary embodiment hubcap 300.

With reference to FIG. 8, flange portion 206 of wheel hub 201 is a substantially annular shaped structural member that includes a main central section 272. Flange portion 206 also includes a radially and circumferentially-extending attachment section 274 extending radially outward from main central section 272. Attachment section 274 is formed with a plurality of circumferentially spaced openings 254, which axially align with corresponding openings formed in a radially extending mounting flange or mounting segment (not shown) of the outboard mounted disc brake rotor (not shown). A plurality of mechanical fasteners (not shown), such as wheel studs, extend through the openings in the mounting segment of the outboard mounted disc brake rotor and through coaxially-aligned openings 254 in attachment section 274 of flange portion 206. A wheel rim (not shown) is mounted on the plurality of mechanical fasteners. Nuts (not shown) are tightened on the mechanical fasteners and against the wheel rim, which also forces flange portion 206 against the outboard mounted disc brake rotor. Main central section 272 includes a plurality of pilots 280, which assist in aligning and mounting the wheel rim.

With continued reference to FIG. 8, main central section 272 is formed with a central and circular opening 270 through which part of hub portion 202 may extend. Main central section 272 is formed with a plurality of cut-outs 273 continuous with opening 270. Cut-outs 273 have slightly larger profiles than bosses 235 formed about the outboard end of cylindrical body 210 of hub portion 202. Together, opening 270 in main central section 272 and plurality of cut-outs 273 formed continuous with the opening have a profile that closely or tightly fits over the outboard end of cylindrical body 210 of hub portion 202 and provides clearance for the hub portion.

Main central section 272 of flange portion 206 of wheel hub 201 axially engages the outboard surface of the flange mounting section of hub portion 202. More specifically, main central section 272 is formed with another plurality of openings 276, which extend axially through the main central section. Each of the openings 276 receives a respective fastener (not shown) that is threaded into corresponding threaded openings (not shown) formed in the flange mounting section of hub portion 202. Each of the fasteners is tightened against the main central section 272 to rigidly fasten flange portion 206 to the flange mounting section of hub portion 202.

The largest dimension of hub portion 202 is smaller than the smallest inner diameter of the outboard mounted disc brake rotor. Accordingly, once the fasteners securing main central section 272 of flange portion 206 to the flange mounting section of hub portion 202 are removed, flange portion of wheel hub 201 and the attached outboard mounted disc brake rotor can be removed from wheel end assembly 200 as a unit, without requiring removal of the hub portion from axle spindle 205 (FIG. 10). In addition, hub portion 202 also can be removed from axle spindle 205 without removing the outboard mounted disc brake rotor. More specifically, flange portion 206 is first detached from the outboard mounted disc brake rotor. Flange portion 206 and hub portion 202 can then be removed from axle spindle 205 as a unit.

Figure 9:
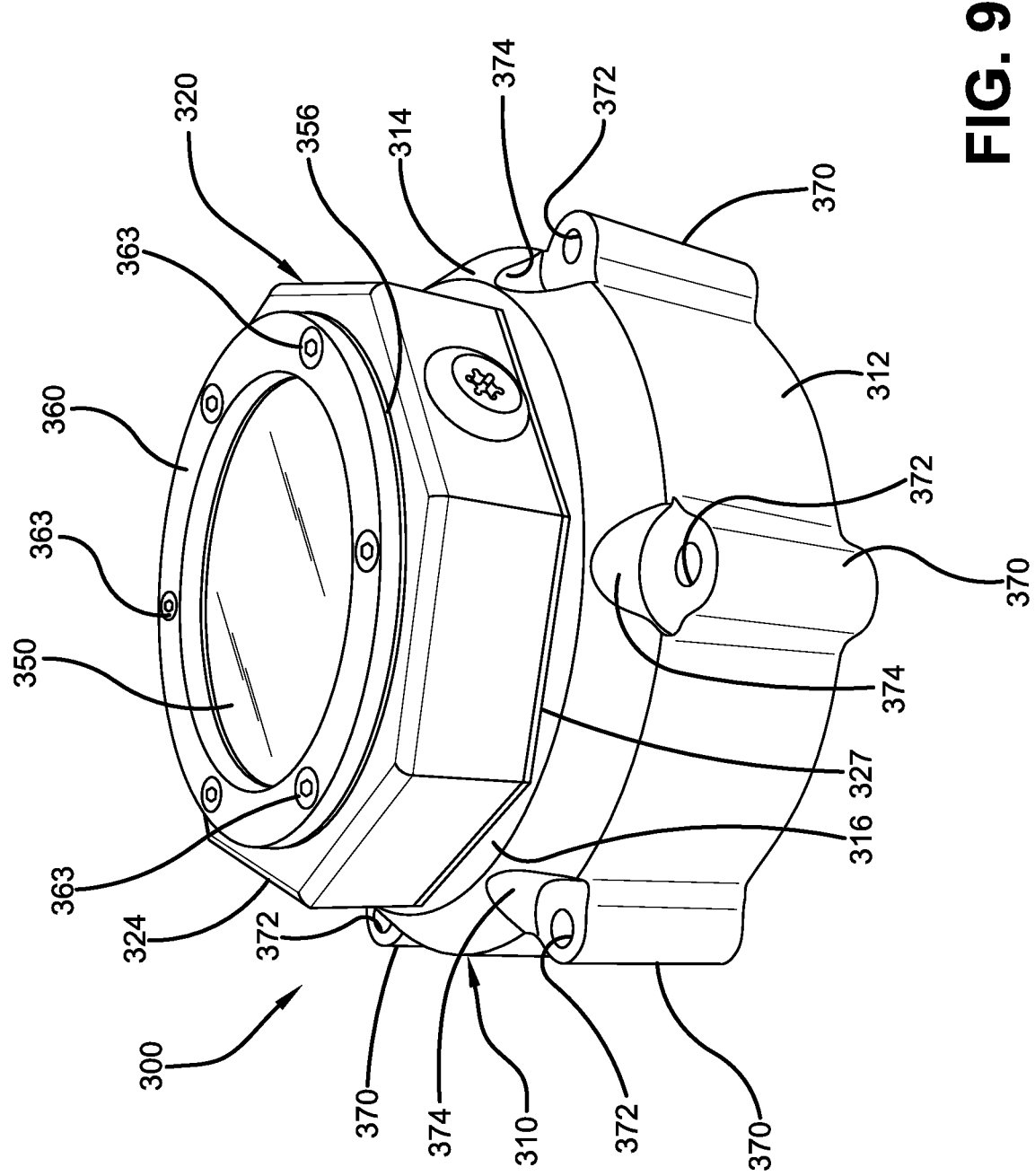
FIG. 9 is an enlarged perspective view of the exemplary embodiment hubcap shown in FIG. 8.

With reference to FIGS. 8 and 10, exemplary embodiment hubcap 300 for a heavy-duty vehicle of the disclosed subject matter is shown utilized in conjunction with wheel hub 201. With reference to FIGS. 8, 9, and 10, exemplary embodiment hubcap 300 generally includes an inboard portion or base portion 310, an outboard portion 320, and an outboard wall 350. Inboard portion 310 is formed of a sturdy material, such as cast aluminum, cast steel, or composite. Inboard portion 310 is preferably formed of die cast aluminum or a plastic composite. Inboard portion 310 includes a generally cylindrical side wall 312. Inboard portion 310 further includes a frustoconical transition portion 314 integrally formed with and extending outboardly from side wall 312. An end wall 316 is integrally formed with transition portion 314. End wall 316 extends radially inwardly from transition portion 314 and is formed with a central opening 318 (FIGS. 10-11), the purpose of which will be described below. End wall 316 also is formed with a plurality of circumferentially spaced openings 317 (FIGS. 10-11) positioned about the end wall, which enable attachment of outboard portion 320 of hubcap 300 to inboard portion 310, as will be described in detail below. It is to be understood that inboard portion 310 could have different constructions than that shown and described without affecting the overall concept or operation of the disclosed subject matter. For example, inboard portion 310 could include a construction in which cylindrical side wall 312 is formed with or connected to end wall 316 without a transition portion, such as transition portion 314, without affecting the overall concept or operation of the disclosed subject matter. It is further contemplated that cylindrical side wall 312, transition portion 314, and end wall 316 of inboard portion 310 could have different shapes and constructions than that shown and described without affecting the overall concept or operation of the disclosed subject matter.

With reference to FIGS. 8 and 9-11, inboard portion 310 of exemplary embodiment hubcap 300 includes a plurality of elongated bosses 370. Plurality of elongated bosses 370 are integrally formed with and circumferentially spaced about the circumference of side wall 312 of inboard portion 310. With reference to FIG. 10, elongated bosses 370 include a length L that provides sufficient clearance for lock nut 221 within an interior cavity 313 of inboard portion 310 of hubcap 300. Plurality of elongated bosses 370 are mounting structure that enable hubcap 300 to be removably attached to wheel hub 201. More specifically, each one of plurality of elongated bosses 370 is formed with an elongated opening 372 extending axially through the boss. Each of elongated bosses 370 corresponds to and aligns with a respective boss 235 of hub portion 202 of wheel hub 201, such that the elongated bosses and bosses of the hub portion are continuous with one another, and elongated opening 372 of the elongated boss aligns with a respective threaded opening 237 formed in the boss of the hub portion. A recess 374 is formed in transition portion 314 of inboard portion 310 adjacent each elongated boss 370, the purpose of which will be described below.

Hubcap 300 preferably includes six (6) elongated bosses 370 integrally formed with side wall 312 of inboard portion 310, but could include more or less than six bosses, such as four (4) or eight (8) bosses, so long as the elongated bosses correspond to respective ones of threaded openings 237 of hub portion 202 of wheel hub 201 and correspond with the pattern of cut-outs 273 of main central section 272 of flange portion 206, without affecting the overall concept or operation of the disclosed subject matter. Elongated bosses 370 of hubcap 300 are preferably evenly circumferentially spaced about side wall 312 of inboard portion 310. Hubcap 300 could even include an odd number of elongated bosses 370 integrally formed with side wall 312 of inboard portion 310, such as five (5) elongated bosses, so long as the elongated bosses correspond to respective ones of threaded openings 237 of hub portion 202 of wheel hub 201 and correspond with the pattern of cut-outs 273 of main central section 272 of flange portion 206, without affecting the overall concept or operation of the disclosed subject matter.

With reference to FIGS. 8 and 10, a generally ring-shaped gasket 380 is disposed between the inboard end of inboard portion 310 of exemplary embodiment hubcap 300 and the outboard end of hub portion 202 of wheel hub 201. The shape of gasket 380 substantially corresponds to the shape of the inboard end of inboard portion 310 of exemplary embodiment hubcap 300 and the outboard end of hub portion 202 of wheel hub 201. With particular reference to FIGS. 8A and 10, gasket 380 is formed with a plurality of openings 382, which align axially with elongated openings 372 of elongated bosses 370 and threaded openings 237 of bosses 235 of hub portion 202. A bolt (not shown), or other suitable fastener, is disposed through each axially aligned elongated opening 372, opening 382 of gasket 380 and threadably engages a respective threaded opening 237 formed in boss 235 of hub portion 202 to removably secure hubcap 300 to wheel hub 201. Recesses 374 formed in transition portion 314 of inboard portion 310 adjacent respective elongated bosses 370 provide sufficient clearance for a tool, such as a ratchet, to enable tightening of the respective bolts. Once hubcap 300 is removably secured to wheel hub 201 in the manner described above, gasket 380 provides sealing between the hubcap and the wheel hub.

Outboard portion 320 (FIGS. 8, 9, and 10) of exemplary embodiment hubcap 300 is formed of a lightweight rigid material, such as aluminum or composite. With reference to FIGS. 8, 9, and 10, outboard portion 320 includes a component mounting block 322 (FIG. 10) and a perimeter ring 324 integrally formed with the mounting block. A plurality of slots 334 (FIG. 10) may be formed between perimeter ring 324 and component mounting block 322 to enable passage of lubricant from interior cavity 313 of inboard portion 310 of hubcap 300 to the interior of outboard portion 320 of the hubcap. Component mounting block 322 enables optional mounting of components of a tire inflation system, including a rotary union 330 (FIG. 10), which is shown mounted to the component mounting block via fasteners 333 (FIG. 10) or any suitable means.

Perimeter ring 324 is formed with one or more openings (not shown) for accommodating attachment of one or more tire inflation system valves (not shown). It is to be understood that exemplary embodiment hubcap 300 of the disclosed subject matter could be utilized with wheel end assemblies that do not employ tire inflation systems without affecting the overall concept or operation of the disclosed subject matter. In such instances, exemplary embodiment hubcap 300 could be formed without component mounting block 322 and/or the openings formed in perimeter ring 324 for accommodating attachment of one or more tire inflation system valves, without affecting the overall concept or operation of the disclosed subject matter.

With reference to FIG. 10, perimeter ring 324 includes a plurality of circumferentially spaced first threaded openings 326 formed in the inboard side of the perimeter ring, which extend partially into the perimeter ring in an axially outboard direction. With reference to FIGS. 8, 9, and 10, outboard portion 320 includes a ring-shaped first gasket 327 positioned over the inboard side of perimeter ring 324. First gasket 327 is formed with circumferentially spaced openings 329 (FIG. 10), which are axially aligned with first threaded openings 326 of perimeter ring 324. Openings 329 of first gasket 327 and first threaded openings 326 are axially aligned with respective openings 317 (FIGS. 10-11) formed in end wall 316 of inboard portion 310. With reference to FIG. 10, a plurality of bolts 319, or other suitable fasteners, are disposed through respective aligned openings 317 of end wall 316, openings 329 of first gasket 327, and threadably engage respective first threaded openings 326 of perimeter ring 324 to secure outboard portion 320 of hubcap 300 to inboard portion 310. Because first gasket 327 is positioned between inboard portion 310 and outboard portion 320, once the outboard portion is secured to the inboard portion via bolts 319, the gasket provides an effective seal to prevent contaminants from entering into exemplary embodiment hubcap 300 and/or lubricant from escaping from the hubcap between the inboard portion and the outboard portion. It should be understood that assembly of inboard hubcap portion 310 to outboard hubcap portion 320 occurs before the inboard hubcap portion is mounted on wheel hub 201, but the hubcap structure was described in this order for illustrative purposes.

With continued reference to FIG. 10, perimeter ring 324 includes a circumferentially-extending recess 332 formed in the outboard surface of the perimeter ring, in which outboard wall 350 of exemplary embodiment hubcap 300 is seated. More specifically, outboard wall 350 is integrally formed with a circumferential seating structure 352 positioned radially inwardly of the outboard wall radial edge. Seating structure 352 extends inboardly from the inboard side of outboard wall 350, so that when the outboard wall seats within recess 332, the outboard surface of the outboard wall is coplanar with the outboard surface of perimeter ring 324. An O-ring 354 is positioned on the inboard surface of outboard wall 350 radially outwardly of circumferential seating structure 352, and provides a seal between the outboard wall and perimeter ring 324 via deformation of the O-ring. It is to be understood that other types of seals could be utilized to seal between outboard wall 350 and perimeter ring 324, such as a polymeric gasket, without affecting the overall concept or operation of the disclosed subject matter. Perimeter ring 324 also includes a plurality of circumferentially spaced second threaded openings 328 formed in the outboard side of the perimeter ring, which extend partially into the perimeter ring in an axially inboard direction, the purpose of which will be described herein below.

With reference to FIGS. 8, 9, and 10, outboard portion 320 of exemplary embodiment hubcap 300 also includes a retaining ring 360, which is utilized to secure outboard wall 350 to perimeter ring 324 of outboard portion 320. A ring-shaped second gasket 356 is disposed between the inboard surface of retaining ring 360 and the co-planer junction of the outboard surfaces of perimeter ring 324 and outboard wall 350. With reference to FIG. 10, second gasket 356 is formed with a plurality of circumferentially spaced openings 357, which are axially aligned with second threaded openings 328 of perimeter ring 324 and a plurality of circumferentially spaced openings 362 formed in retaining ring 360. A plurality of fasteners 363 are disposed through respective openings 362 of retaining ring 360, openings 357 of second gasket 356, and threadably engage second threaded openings 328 of perimeter ring 324 to secure outboard wall 350 of hubcap 300 to outboard portion 320. Because second gasket 356 is disposed between the inboard surface of retaining ring 360 and the co-planer junction of the outboard surfaces of perimeter ring 324 and outboard wall 350, once the outboard wall is secured within recess 332 of the perimeter ring, the second gasket provides an effective seal to prevent contaminants from entering into hubcap 300 and/or lubricant escaping from the hubcap between outboard portion 320 and outboard wall 350. It is to be understood that retaining ring 360 could also be a solid disc that covers the entire outboard end of exemplary embodiment hubcap 300 without affecting the overall concept or operation of the disclosed subject matter. With reference to FIGS. 8, 9, and 10, outboard wall 350 of hubcap 300 is tinted, transparent, or translucent, which enables visual inspection of lubricant levels within wheel end assembly 200 by nature of passage of lubricant from within annular cavity 220 (FIG. 10) of wheel hub 201, through interior cavity 313 (FIG. 10) of inboard portion 310, and into outboard portion 320 through plurality of slots 334 (FIG. 10). Alternatively, when semi-fluid grease is utilized to lubricate components within wheel end assembly 200, such as outboard bearing 222 and the inboard bearing (not shown) of wheel hub 201, outboard wall 350 can be opaque or solid aluminum, as visual inspection of grease amounts within the wheel end assembly is generally not necessary.

In accordance with an important aspect of the disclosed subject matter, exemplary embodiment hubcap 300 provides increased and more uniform clamping force between the hubcap and wheel hub 201, as compared to the clamping force exhibited by many prior art hubcaps that utilize cantilevered flanges to secure the hubcaps to wheel hubs, such as prior art hubcap 40 described above. More specifically, because elongated bosses 370 are integrally formed with side wall 312 of inboard hubcap portion 310, the elongated bosses cooperate with the thickened side wall to provide a stiffened or rigid side wall and transition portion 314 structure between respective elongated bolt openings 372 of adjacent elongated bosses that directly compresses gasket 380 without cantilever, which results in increased and more uniform clamping force between hubcap 300 and wheel hub 201 when the hubcap is attached to the wheel hub in the manner described above. The increased and more uniform clamping force between hubcap 300 and wheel hub 201 in turn provides a better, more uniform seal between the hubcap and the wheel hub to prevent or minimize leakage of lubricant from wheel end assembly 200 and/or entry of contaminants into the wheel end assembly.

Furthermore, the overall length of each elongated boss 370, and thus the length of the bolt disposed through the respective elongated opening 372 utilized to threadably engage threaded opening 237 formed in boss 235 of hub portion 202, further increases and unifies the clamping force between exemplary embodiment hubcap 300 and wheel hub 201. Finite element analysis was performed to determine pressure distribution and clamp force exhibited by hubcap 300 with varying lengths L of elongated openings 372, by removing material from the inboard end of inboard portion 310, including material from elongated bosses 370, referred to herein as "bottom-up removal". Finite element analysis was also performed to determine pressure distribution and clamp force exhibited by hubcap 300 with varying lengths L of elongated openings 372 by removing material only from the elongated bosses in an inboard direction from the outboard surface of the elongated bosses, referred to herein as "top-down removal". Specifically, finite element analysis was performed to determine clamping force and pressure distribution of hubcap 300 with elongated bosses 370 including a length L of 1.765 inches. Finite element analysis was also performed to determine clamping force and pressure distribution of hubcap 300 with elongated bosses 370 including a length L of 1.140 inches, 0.640 inches, and 0.250 inches by bottom-up removal and a length of 1.140 inches, 0.640 inches, and 0.250 inches by top-down removal. Finite element analysis was also performed to determine pressure distribution and clamp force of a prior art hubcap which utilizes a cantilevered flange to secure the hubcap to a wheel hub, such as prior art hubcap 40 described above, for purposes of comparison.

The data from the finite element analysis showed that even when elongated bosses 370 of exemplary embodiment hubcap 300 include a length L of 0.250 by either bottom-up or top-down removal, or approximately equal to that of the length of the flange of a prior art hubcap which utilizes a cantilevered flange to secure the hubcap to a wheel hub, the exemplary embodiment hubcap provided relatively greater clamp force and more uniform pressure distribution compared to the prior art hubcap that includes a flange. In addition, the data from the finite element analysis showed that increasing the length L of elongated bosses 370 results in greater clamp force and more uniform pressure distribution of hubcap 300, regardless of whether top-down or bottom-up removal was employed. Preferably, elongated bosses 370 include a length L that is about one (1.0) inch or greater. It is to be understood that length L of each of elongated bosses 370 can be more or less than one (1.0) inch to provide sufficient clearance for components of a wheel end assembly, such as a lock nut, depending on the configuration of the wheel end assembly and/or the particular structure of the lock nut employed, while still providing increased and more uniform clamping force between hubcap 300 and hub portion 202 of wheel hub 201.

In addition, because plurality of elongated bosses 370 are integrally formed with side wall 312 of inboard portion 310 of exemplary embodiment hubcap 300, the hubcap provides increased and uniform clamping force on gasket 380 in the areas of the gasket disposed around the midpoint between elongated openings 372 of the elongated bosses, which increases uniformity of the seal that the gasket provides between the hubcap and wheel hub 201. As previously discussed, in hubcaps which utilize a cantilevered flange to secure the hubcap to a wheel hub, such as prior art hubcap 40, non-optimal clamping force is exerted on the gasket between the outboard end of the wheel hub and the flange around the midpoint between adjacent bolt openings due to the arcuate orientation of the wheel hub outboard end relative to the midpoint and deflection of the flange in such areas. In contrast, because elongated bosses 370 of hubcap 300 are integrally formed with side walls 312, the hubcap provides a thick, rigid, and non-cantilevered structure, which is substantially resistant to deflection, including in the areas around the midpoint between adjacent elongated openings 372 of elongated bosses 370.

Figure 11:
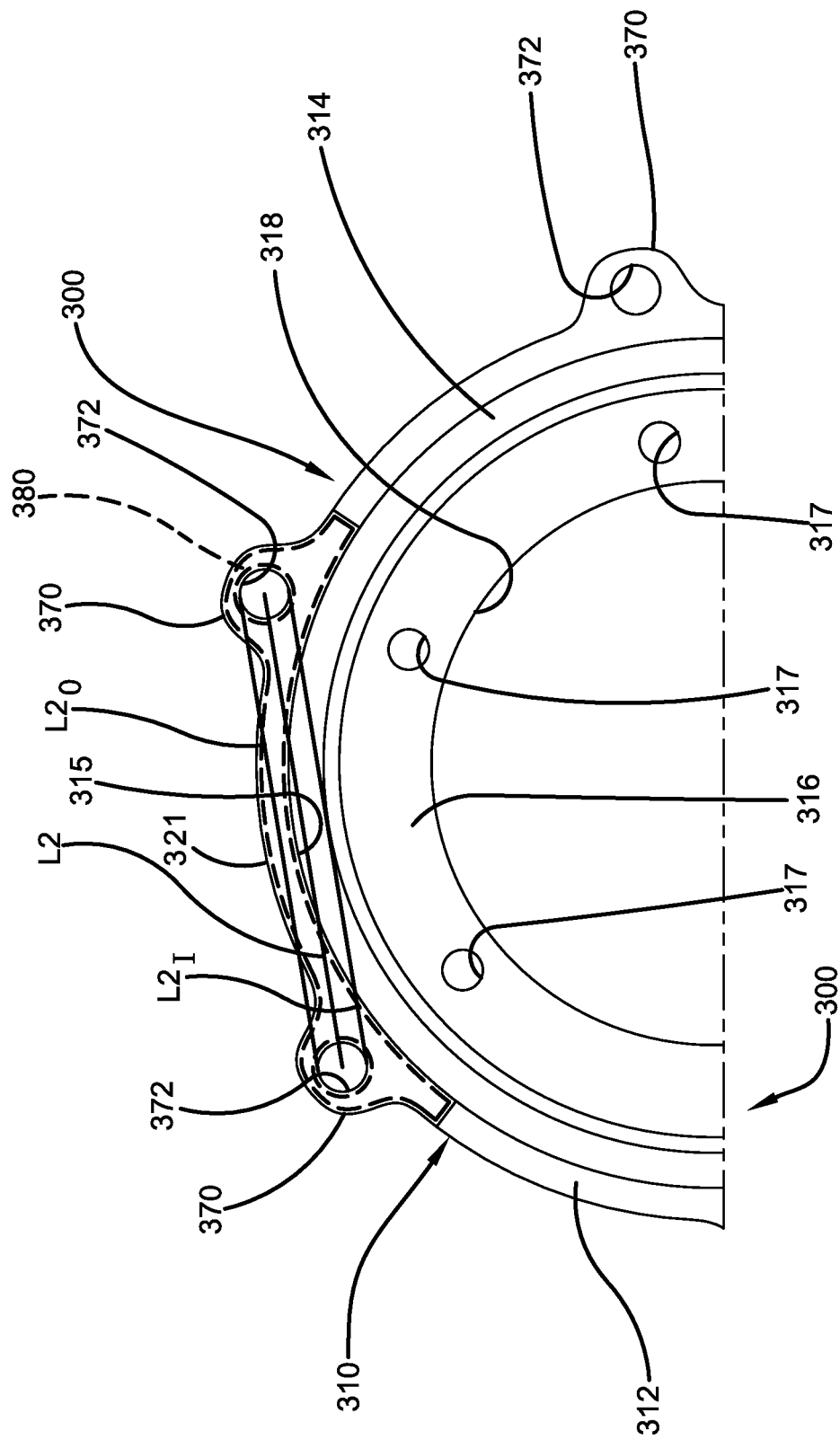
FIG. 11 is a fragmentary elevation view of an inboard portion of the exemplary embodiment hubcap shown in FIG. 8, and looking in an inboard direction, showing the orientation of a plurality of illustrative lines passing through and tangential to adjacent boss openings and relative to the sealing portion of the exemplary embodiment hubcap, with a hidden portion of the gasket shown in phantom lines.

With reference to FIG. 11, the area of peak clamping force that can be exerted on gasket 380 between adjacent elongated openings 372 of elongated bosses 370 is between an outer line $L2_O$ and an inner line $L2_I$ tangential to and extending between the adjacent elongated openings, with the greatest clamping force being exhibited in the area along a line L2. As a radially inner edge 315 of side wall 312 of inboard portion 310 is adjacent to line L2 and a radially outer edge 321 of the side wall is radially outward of outer line $L2_O$ extending between adjacent elongated openings 372, a large percentage of the clamping surface of gasket 380 between the outboard end of hub portion 202 of wheel hub 201 and the inboard end of inboard portion 310 of hub cap 300 is disposed along or adjacent to line L2 between adjacent bolts, and particularly around the midpoint of line L2. Because exemplary embodiment hubcap 300 includes a rigid, non-cantilevered structure that is substantially resistant to deflection in the entire area between adjacent elongated openings 372 of elongated bosses 370, higher clamp pressures can be maintained, resulting in increased clamping force on gasket 380 between the outboard end of hub portion 202 of wheel hub 201 and the inboard end of inboard portion 310 of hub cap 300 around the midpoint between adjacent elongated openings, as compared to the clamping force on gasket 80 around the midpoint between adjacent openings 44 of prior art hubcap 40 (FIGS. 1-3). Thus, because plurality of elongated bosses 370 are integrally formed with side wall 312 of inboard portion 310 of hubcap 300, a substantial portion of gasket 380 experiences peak clamping force, including the area at and around the midpoint between adjacent elongated openings 372, which provides more uniform clamping force on the gasket between the inboard end of the inboard portion of the hubcap and the outboard end of hub portion 202 of wheel hub 201. The more uniform clamping force on gasket 380 in turn provides improved sealing between hubcap 300 and wheel hub 201.

In accordance with another important aspect of the disclosed subject matter, exemplary embodiment hubcap 300 includes structure that enables an outboard mounted disc brake rotor to be removed from wheel end assembly 200 without requiring the hubcap to be removed prior to removal of the rotor. More specifically, and as indicated above, each of elongated bosses 370 of inboard portion 310 of hubcap 300 corresponds to and aligns with a respective boss 235 of hub portion 202 of wheel hub 201 when the hubcap is removably secured to the wheel hub in the manner described above, such that the radially outward surfaces of the elongated bosses and bosses of the hub portion are continuous with one another. Because cut-outs 273 of main central section 272 of flange portion 206 of wheel hub 201 have a slightly larger profile than bosses 235 formed about the outboard end of hub portion 202 of the wheel hub, and elongated bosses 370 are continuous with the bosses, the profile of hubcap 300 provides clearance to enable the flange portion of the wheel hub with attached outboard mounted disc brake rotor to be removed from wheel end assembly 200 without requiring removal of the hubcap.

Thus, exemplary embodiment hubcap 300 of the disclosed subject matter overcomes the deficiencies of prior art hubcaps and provides increased and more uniform clamping force between the hubcap and a wheel hub, thereby providing a better, more uniform seal between the hubcap and the wheel hub to prevent or minimize leakage of lubricant from the wheel end assembly and/or entry of contaminants into the wheel end assembly. In addition, hubcap 300 of the disclosed subject matter provides clearance for removal of an outboard mounted disc brake rotor in heavy-duty vehicle wheel end assemblies that include outboard mounted disc brake rotor configurations without requiring the hubcap to be removed prior to removing the disc brake rotor.

Figure 12:
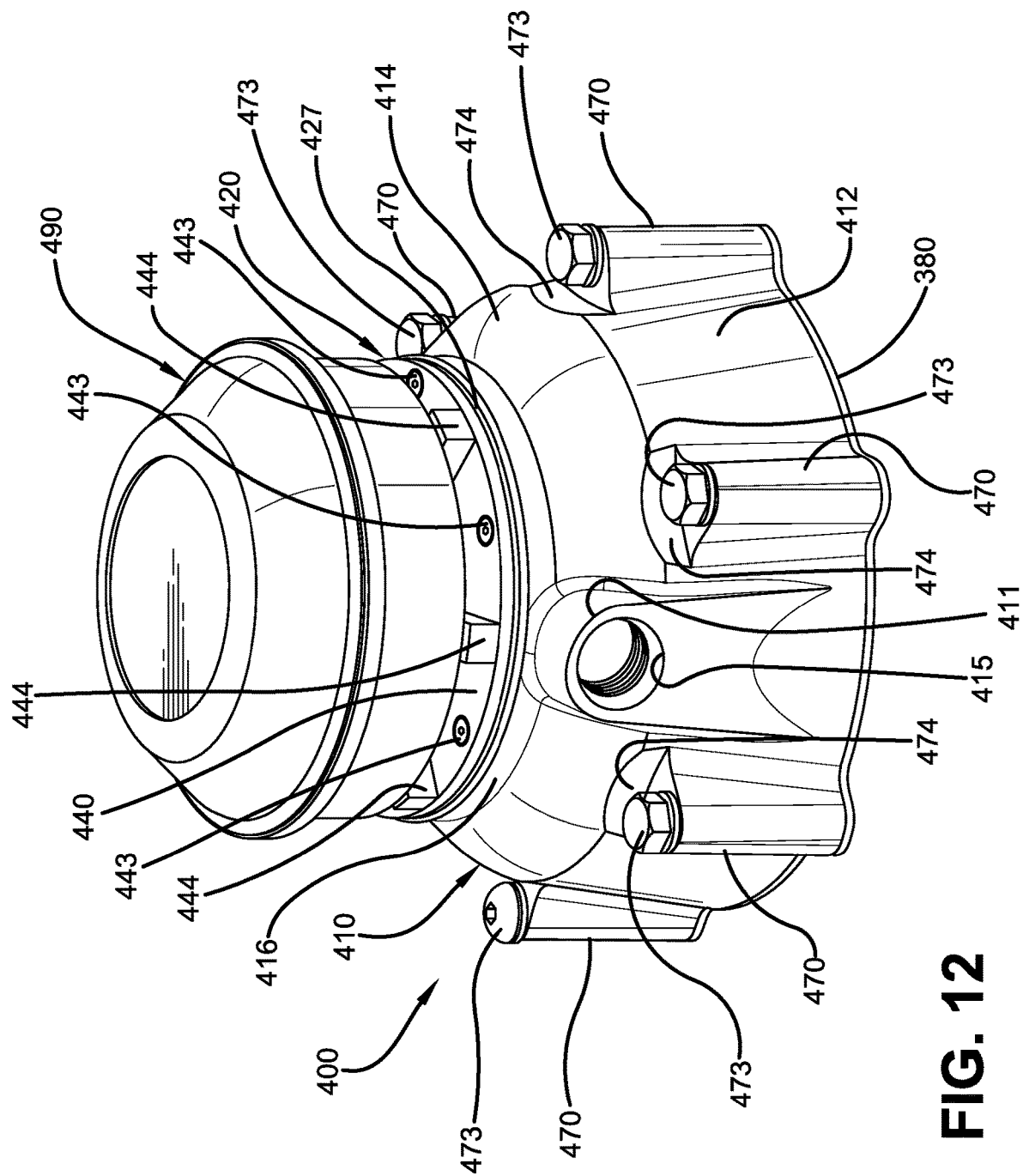
FIG. 12 is a perspective view of a first alternative exemplary embodiment hubcap of the disclosed subject matter.
Figure 13:
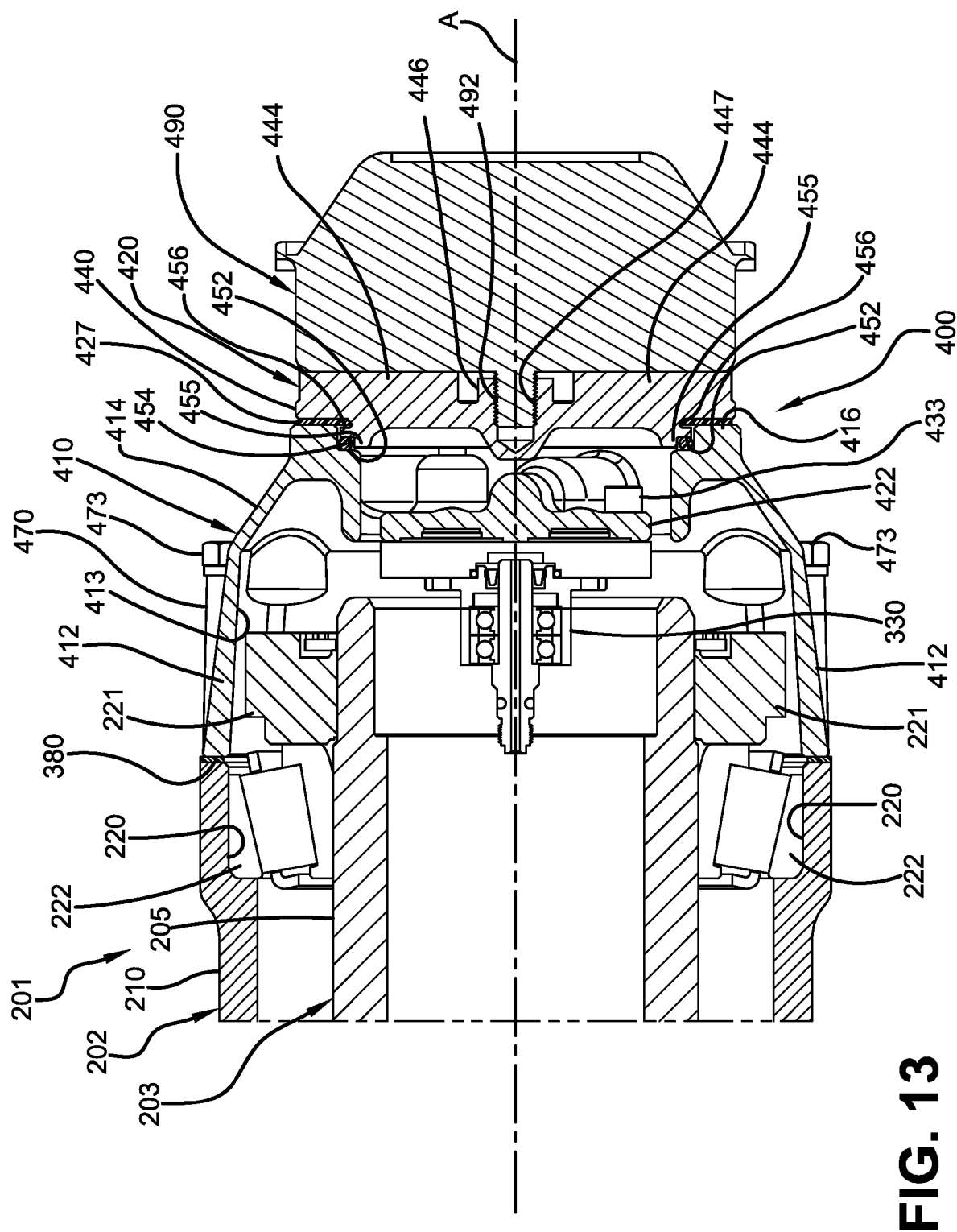
FIG. 13 is a fragmentary cross-sectional view of the first alternative exemplary embodiment hubcap of FIG. 12, shown attached to a portion of a wheel hub of a wheel end assembly.
Figure 14:
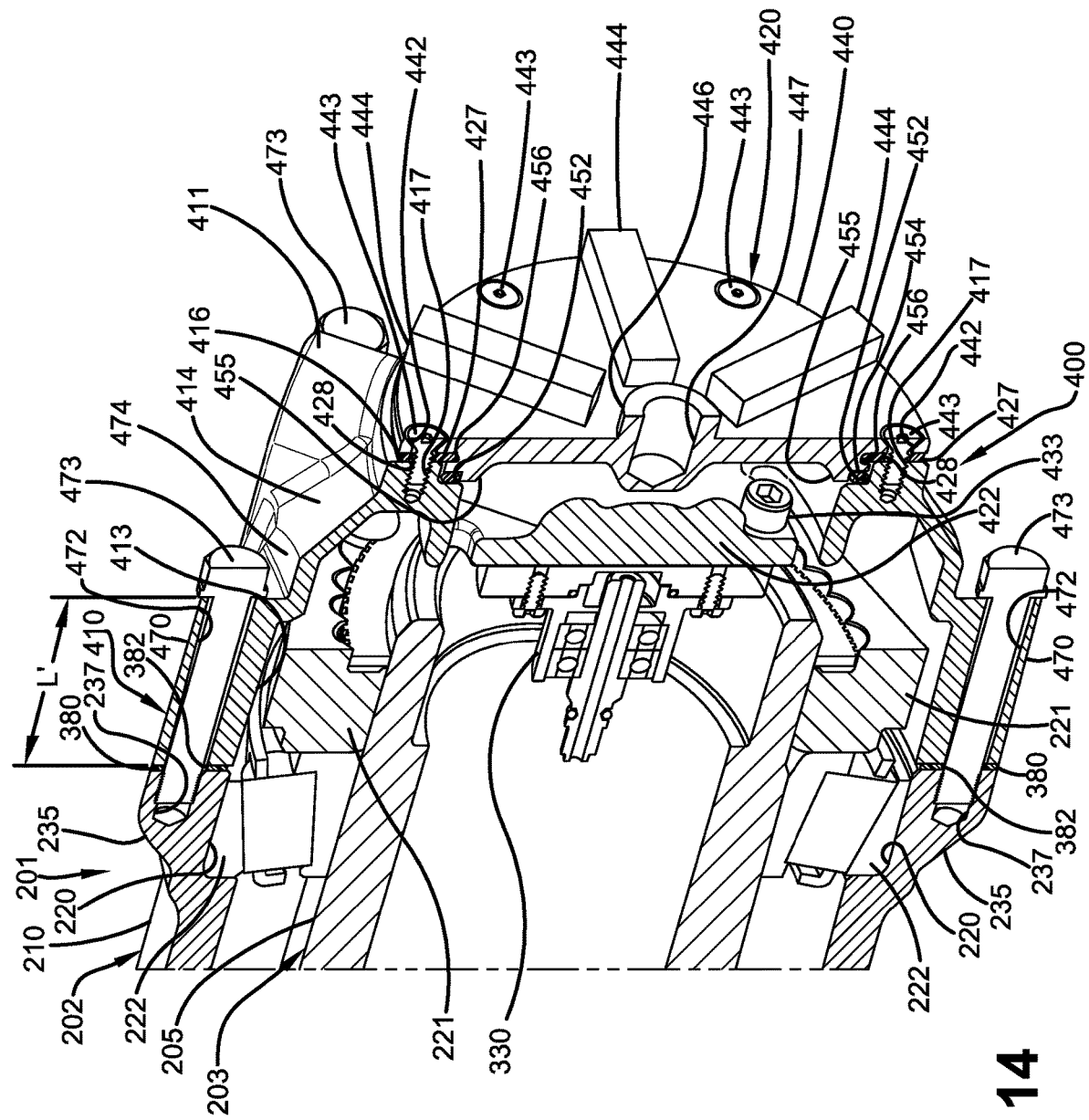
FIG. 14 is a fragmentary cross-sectional perspective view of the first alternative exemplary embodiment hubcap and wheel hub portion of FIG. 13, showing the hub odometer removed from the hubcap.

A first alternative exemplary embodiment hubcap for a heavy-duty vehicle of the disclosed subject matter is shown in FIGS. 12-15 and is indicated generally at 400. With reference to FIGS. 13 and 14, first alternative exemplary embodiment hubcap 400 is shown utilized in conjunction with wheel hub 201 of wheel end assembly 200.

First alternative exemplary embodiment hubcap 400 is generally similar in structure and function to exemplary embodiment hubcap 300 described above, except that the alternative exemplary embodiment hubcap includes structure that enables mounting of a hub odometer and includes structure that reduces the overall weight of the hubcap, as will be described in detail below. With reference to FIGS. 12-14, hubcap 400 generally includes an inboard portion or base portion 410 and an outboard portion 420. Inboard portion 410 is formed of a sturdy material, such as cast aluminum, cast steel, or composite. Inboard portion 410 is preferably formed of die cast aluminum or a plastic composite. With reference to FIGS. 12-13, inboard portion 410 includes a generally cylindrical side wall 412. With reference to FIGS. 12-14, inboard portion 410 also includes a frustoconical transition portion 414 integrally formed with and extending outboardly from side wall 412. Inboard portion 410 further includes a mounting ring 416 integrally formed with the outboard end of transition portion 414. Mounting ring 416 is formed with a plurality of circumferentially spaced openings 417 (FIG. 14) positioned about the outboard end of the mounting ring, which enable attachment of outboard portion 420 of hubcap 400 to inboard portion 410, as will be described in detail below.

A component mounting block 422 (FIGS. 13-14) is integrally formed with mounting ring 416 radially inwardly of the mounting ring. Component mounting block 422 enables mounting of components of a tire inflation system, including rotary union 330 (FIGS. 13-14), which is shown mounted to the component mounting block via fasteners 433 (FIGS. 13-14) or any suitable means. One or more tire inflation system valve bosses 411 (FIGS. 12 and 14) are integrally formed with side wall 412, transition portion 414, and mounting ring 416. Each one of tire inflation system valve bosses 411 is formed with a respective opening 415 for accommodating attachment of a tire inflation system valve (not shown). It is to be understood that hubcap 400 could be utilized with wheel end assemblies that do not employ tire inflation systems without affecting the overall concept or operation of the disclosed subject matter. In such instances, hubcap 400 could be formed without tire inflation system valve bosses 411 and/or component mounting block 422 without affecting the overall concept or operation of the disclosed subject matter.

It is also to be understood that inboard portion 410 could have different constructions than that shown and described without affecting the overall concept or operation of the disclosed subject matter. For example, inboard portion 410 could include a construction in which side wall 412 is formed with or connected to mounting ring 416 without a transition portion, such as transition portion 414, without affecting the overall concept or operation of the disclosed subject matter. It is further contemplated that side wall 412, transition portion 414, and mounting ring 416 of inboard portion 410 could have different shapes and constructions than that shown and described without affecting the overall concept or operation of the disclosed subject matter.

Figure 15:
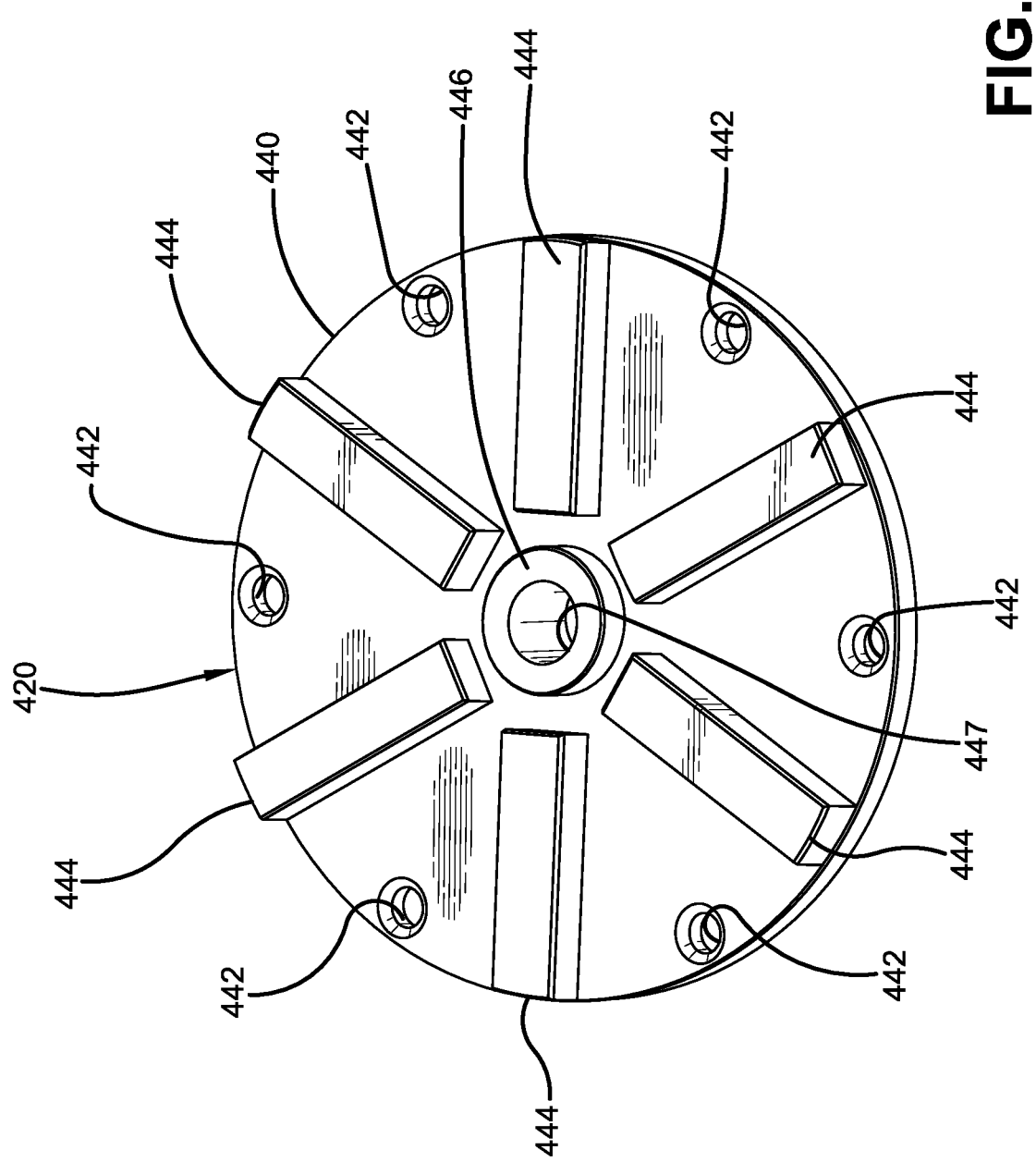
FIG. 15 is a perspective view of a hub odometer mounting structure of the alternative exemplary embodiment hubcap shown in FIG. 12.

With reference to FIGS. 12-15, outboard portion 420 of first alternative exemplary embodiment hubcap 400 is formed of a lightweight rigid material, such as aluminum or composite, and includes a generally disc-shaped base plate 440. Base plate 440 is formed with a plurality of openings 442 (FIGS. 14-15) circumferentially spaced adjacent the radially outward edge of the base plate. With reference to FIG. 14, each one of plurality of openings 442 aligns with a respective opening 417 formed in mounting ring 416 of inboard portion 410. With reference to FIGS. 12-15, base plate 440 includes a plurality of circumferentially arrayed support ribs 444 integrally formed with the outboard surface of the base plate, the purpose of which will be described in detail below. With reference to FIGS. 13-15, base plate 440 further includes a central boss 446 integrally formed with and extending axially inboardly and axially outboardly from the base plate. As is best shown in FIG. 13, central boss 446 extends outboardly from base plate 440 a distance that is less than the distance each support rib 444 extends outboardly from the base plate, the importance of which will be described below. Central boss 446 extends inboardly from base plate 440 a distance that provides sufficient clearance for components of a tire inflation system positioned between component mounting block 422 of inboard portion 410 of hubcap 400 and the base plate when outboard portion 420 is attached to the base portion, as will be described in detail below. Central boss 446 is formed with a threaded socket 447 extending inboardly into the central boss, the importance of which will also be described in detail below.

With reference to FIGS. 13-14, base plate 440 of outboard portion 420 includes a circumferentially extending seating structure 455 integrally formed with the inboard side of the base plate. Seating structure 455 is formed with a circumferentially extending notch 452 in which an O-ring 454 is disposed. O-ring 454 provides sealing between seating structure 455 of base plate 440 and mounting ring 416 of inboard portion 410. Base plate 440 further includes a recess 456, which extends radially inwardly between seating structure 455 and the inboard surface of the base plate. A ring-shaped gasket 427 is disposed within recess 456 and extends radially outwardly to the radial outward edge of base plate 440. Gasket 427 is formed with a plurality of openings 428 (FIG. 14) spaced circumferentially about the gasket. Each one of plurality of openings 428 of gasket 427 aligns with a respective one of plurality of openings 442 of base plate 440 and openings 417 of mounting ring 416 of inboard portion 410. With reference to FIGS. 12 and 14, a screw 443 or other suitable fastener is disposed through each respective aligned one of plurality of openings 442 of base plate 440, plurality of openings 428 of gasket 427, and openings 417 of mounting ring 416 and threadably engages the mounting ring opening to secure outboard portion 420 to inboard portion 410. Together, O-ring 454 and gasket 427 provide sealing between mounting ring 416 and base plate 440, and thus inboard portion 410 and outboard portion 420, to prevent contaminants from entering into hubcap 400 and/or lubricant from escaping from the hubcap between the inboard portion and the outboard portion. It is to be understood that base plate 440 could be formed without recess 456 without affecting the overall concept or operation of the disclosed subject matter, such as when gasket 427 is a paper gasket. In such instances gasket 427 extends radially outwardly from the radial outward edge of seating structure 455 to the radial outward edge of base plate 440.

With reference to FIGS. 12-14, inboard portion 410 of first alternative exemplary embodiment hubcap 400 includes a plurality of elongated bosses 470. Plurality of elongated bosses 470 are integrally formed with and circumferentially spaced about side wall 412 of inboard portion 410. With particular reference to FIG. 14, elongated bosses 470 include a length $L^1$ that provides sufficient clearance for lock nut 221 within an interior cavity 413 (FIGS. 13-14) of inboard portion 410 of hubcap 400. Plurality of elongated bosses 470 are mounting structure that enable hubcap 400 to be removably attached to wheel hub 201. More specifically, each one of plurality of elongated bosses 470 is formed with an elongated opening 472 (FIG. 14) extending axially through the boss. With reference to FIG. 14, each of elongated bosses 470 corresponds to and aligns with a respective boss 235 of hub portion 202 of wheel hub 201, such that the elongated bosses and bosses of the hub portion are continuous with one another, and elongated opening 472 of the elongated boss aligns with a respective threaded opening 237 formed in the boss of the hub portion. With reference to FIGS. 12 and 14, a recess 474 is formed in transition portion 414 of inboard portion 410 adjacent each elongated boss 470, the purpose of which will be described below.

Hubcap 400 preferably includes six (6) elongated bosses 470 integrally formed with side wall 412 of inboard portion 410, but could include more or less than six bosses, such as four (4) or eight (8) bosses, so long as the elongated bosses correspond to respective ones of threaded openings 237 of hub portion 202 of wheel hub 201 and correspond with the pattern of cut-outs 273 of main central section 272 of flange portion 206 of the wheel hub, without affecting the overall concept or operation of the disclosed subject matter. Elongated bosses 470 of hubcap 400 are preferably evenly circumferentially spaced about side wall 412 of inboard portion 410. Hubcap 400 could even include an odd number of elongated bosses 470 integrally formed with side wall 412 of inboard portion 410, such as five (5) elongated bosses, so long as the elongated bosses correspond to respective ones of threaded openings 237 of hub portion 202 of wheel hub 201 and correspond with the pattern of cut-outs 273 of main central section 272 of flange portion 206 of the wheel hub, without affecting the overall concept or operation of the disclosed subject matter.

With reference to FIGS. 13-14, gasket 380 is disposed between the inboard end of inboard portion 410 of first alternative exemplary embodiment hubcap 400 and the outboard end of hub portion 202 of wheel hub 201. The shape of gasket 380 substantially corresponds to the shape of the inboard end of inboard portion 410 of hubcap 400 and the outboard end of hub portion 202 of wheel hub 201. With particular reference to FIG. 14, plurality of openings 382 of gasket 380 align axially with elongated openings 472 of elongated bosses 470 and threaded openings 237 of hub portion 202 of wheel hub 201. With reference to FIGS. 12-14, a bolt 473, or other suitable fastener, is disposed through each axially aligned elongated opening 472, opening 382 of gasket 380 and threadably engages a respective threaded opening 237 formed in boss 235 of hub portion 202 of wheel hub 201 to removably secure hubcap 400 to the wheel hub. Recesses 474 formed in transition portion 414 of inboard portion 410 adjacent respective elongated bosses 470 provide sufficient clearance for a tool, such as a ratchet, to enable tightening of the respective bolts 473. Once hubcap 400 is removably secured to wheel hub 201 in the manner described above, gasket 380 provides sealing between the hubcap and the wheel hub.

First alternative exemplary embodiment hubcap 400 of the disclosed subject matter provides the same advantages as those described with regard to exemplary embodiment hubcap 300 described above in that it provides increased and more uniform clamping force between the alternative exemplary embodiment hubcap and a wheel hub, thereby providing a better, more uniform seal between the hubcap and the wheel hub to prevent or minimize leakage of lubricant from the wheel end assembly and/or entry of contaminants into the wheel end assembly. Like exemplary embodiment hubcap 300, first alternative exemplary embodiment hubcap 400 of the disclosed subject matter also provides clearance for removal of an outboard mounted disc brake rotor in heavy-duty vehicle wheel end assemblies that include outboard mounted disc brake rotor configurations without requiring the hubcap to be removed prior to removing the outboard mounted disc brake rotor.

In addition, first alternative exemplary embodiment hubcap 400 includes structure that enables mounting of a hub odometer 490 (FIGS. 12-14) of a type known in the art. With reference to FIGS. 13-14, threaded socket 447 formed in central boss 446 of outboard portion 420 is adapted to receive a mounting stud 492 (FIG. 13) of hub odometer 490. More specifically, threaded socket 447 is sized such that a mounting stud 492 (FIG. 13) of hub odometer 490 can threadably engage the threaded socket to secure the hub odometer to outboard portion 420 via simple tightening means until the bottom surface of the hub odometer contacts support ribs 444 (FIGS. 12-15), which in turn provide mounting support to the hub odometer once secured. Moreover, because central boss 446 extends outboardly from base plate 440 a distance that is less than the distance each support rib 444 extends outboardly from the base plate, the frictional force between the outboard surfaces of the support ribs and the inboard surface of the hub odometer, and thus between the hub odometer and outboard portion 420, is located away from the threaded connection between the hub odometer mounting stud and threaded socket 447 of central boss 446. This in turn aides in resisting potential loosening of the threaded connection between the hub odometer mounting stud and threaded socket 447 of central boss 446 by road vibration experienced during operation of the heavy-duty vehicle.

Hub odometer 490 preferably includes a diameter less than or equal to that required to allow removal of an outboard mounted disc brake rotor, such as outboard mounted disc brake rotor 104 (FIGS. 6-7), without necessitating removal of the hub odometer once mounted to outboard portion 420. It is to be understood that hub odometer 490 could have other shapes and sizes than that shown without affecting the overall concept or operation of the disclosed subject matter. It is even contemplated that because of the relatively simple tightening means required to mount hub odometer 490 to outboard portion 420 of hubcap 400, the hub odometer could even have a diameter/shape that requires the hub odometer to be removed from outboard portion 420 of hubcap 400 prior to removal of an outboard mounted disc brake rotor, without affecting the overall concept or operation of the disclosed subject matter.

Thus, first alternative exemplary embodiment hubcap 400 provides structure that enables simple and secure mounting of hub odometer 490. In addition, if hub odometer 490 becomes damaged during operation of the heavy-duty vehicle, hub odometer 490 can be removed from base plate 440 of outboard portion 420 simply by unscrewing the hub odometer and can be replaced with a new hub odometer via threaded engagement of the new hub odometer mounting stud with threaded socket 447 of central boss 446. This replacement of hub odometer 490 can be done without requiring outboard portion 420 of hubcap 400 to be removed from inboard portion 410 of the hubcap, thereby preventing contaminants from possibly entering and/or lubricant from exiting the interior of the hubcap, and thus wheel end assembly 200.

First alternative exemplary embodiment hubcap 400 also includes structure that provides decreased weight as compared to exemplary embodiment hubcap 300. More specifically, and with particular reference to FIG. 13, side wall 412 of hubcap 400 is angled toward a line A extending axially through first alternative exemplary embodiment hubcap 400 and tapers in thickness from the inboard end of the side wall to transition portion 414, while still providing sufficient clearance for lock nut 221 within interior cavity 413 of inboard portion 410. Because of the tapered thickness of side wall 412, the side wall requires less material to form as compared to side wall 312 of exemplary embodiment hubcap 300, and thus reduces the overall weight of hubcap 400. It is to be understood that side wall 412 could be angled toward line A at any angle that provides sufficient clearance for lock nut 221 within interior cavity 413 of inboard portion 410 without affecting the overall concept or operation of the disclosed subject matter.

Thus, in addition to providing the same advantages as those provided by exemplary embodiment hubcap 300, first alternative exemplary embodiment hubcap 400 includes structure that enables simple mounting of a hub odometer to the hubcap in a manner that allows removal of an outboard mounted disc brake rotor, without removal of the hubcap and/or hub odometer, and includes structure that reduces the overall weight of the hubcap.

Figure 16:
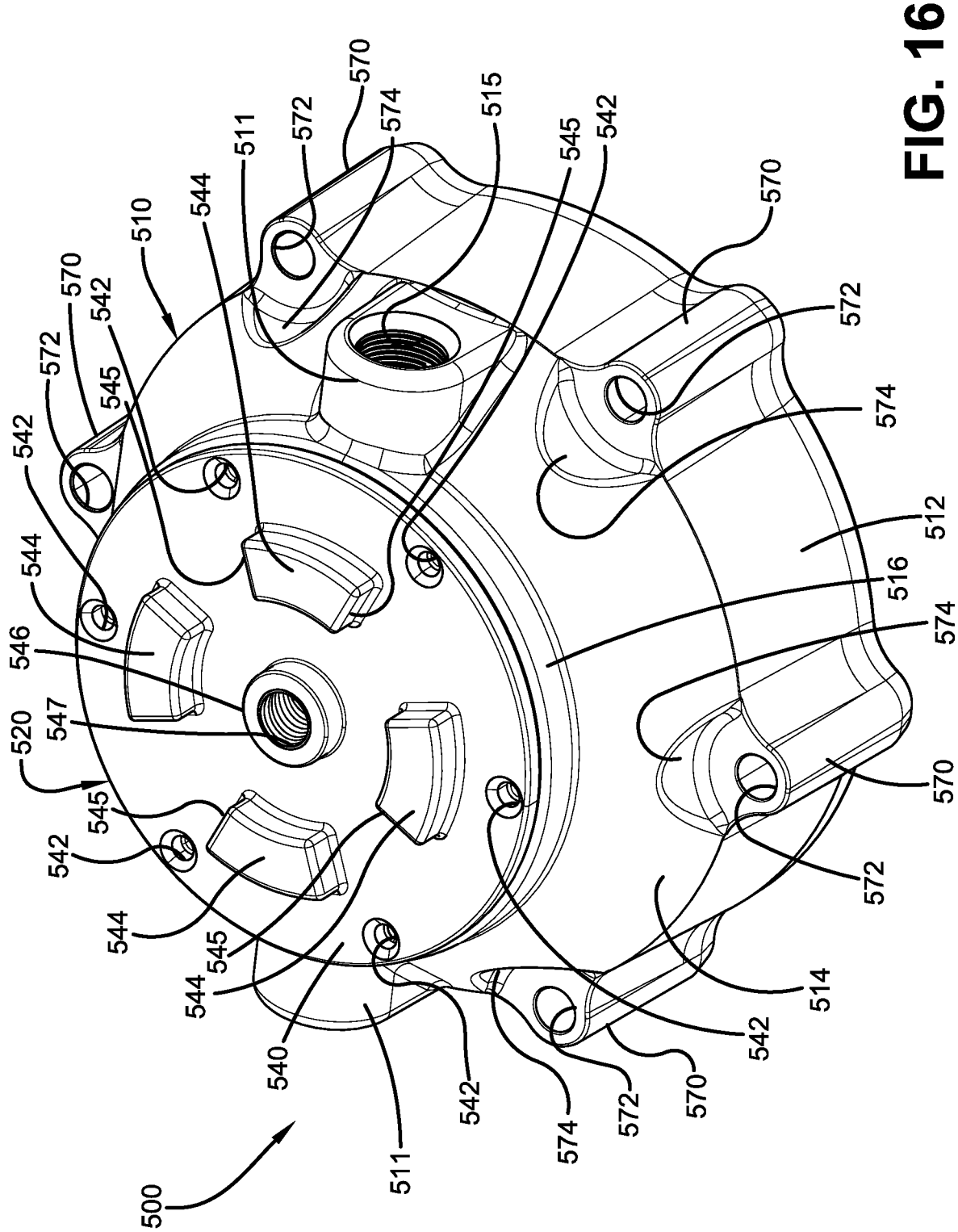
FIG. 16 is a perspective view of a second alternative exemplary embodiment hubcap of the disclosed subject matter.
Figure 17:
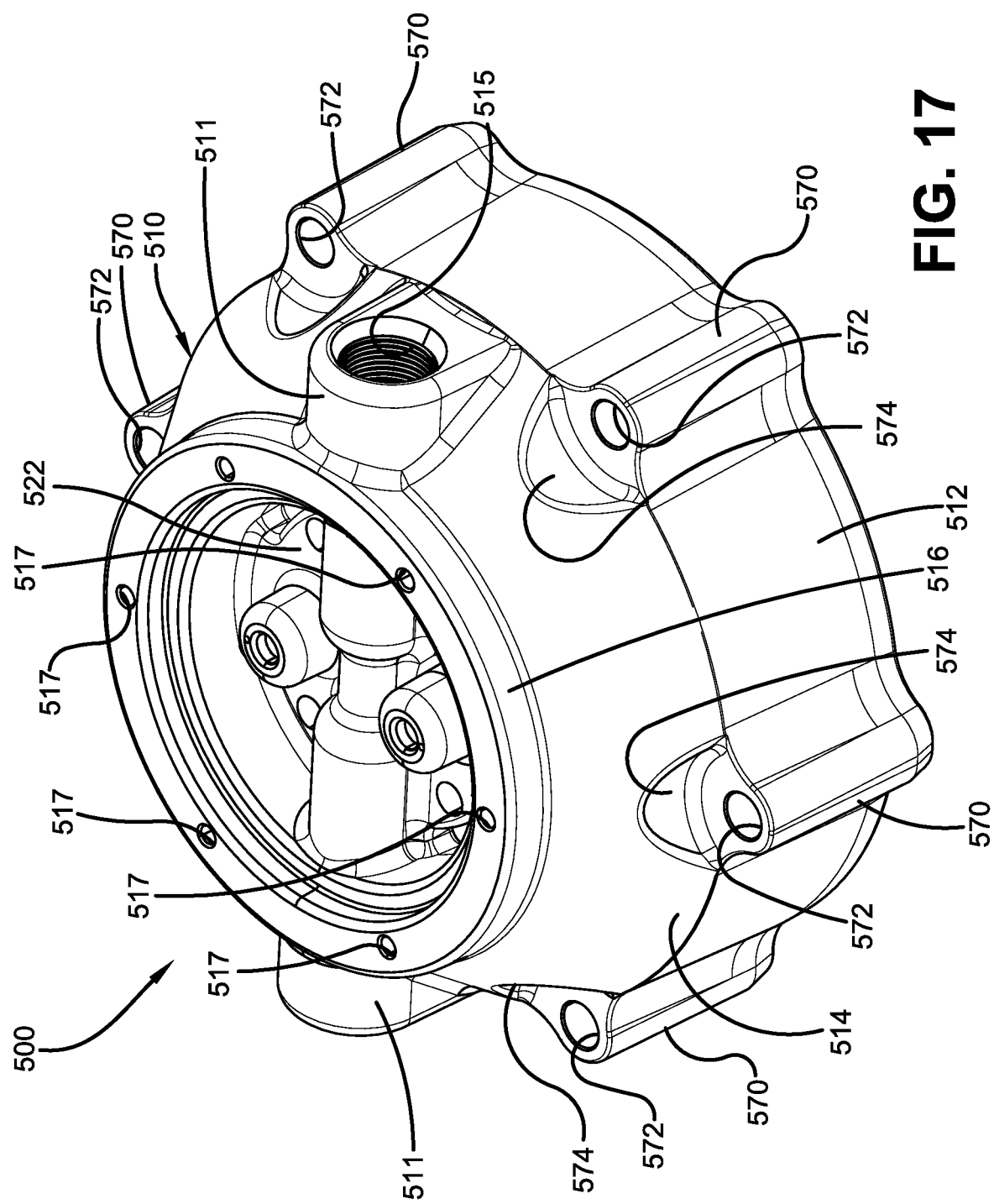
FIG. 17 is a perspective view of the second alternative exemplary embodiment hubcap shown in FIG. 16, showing an outboard portion of the hubcap removed.
Figure 18:
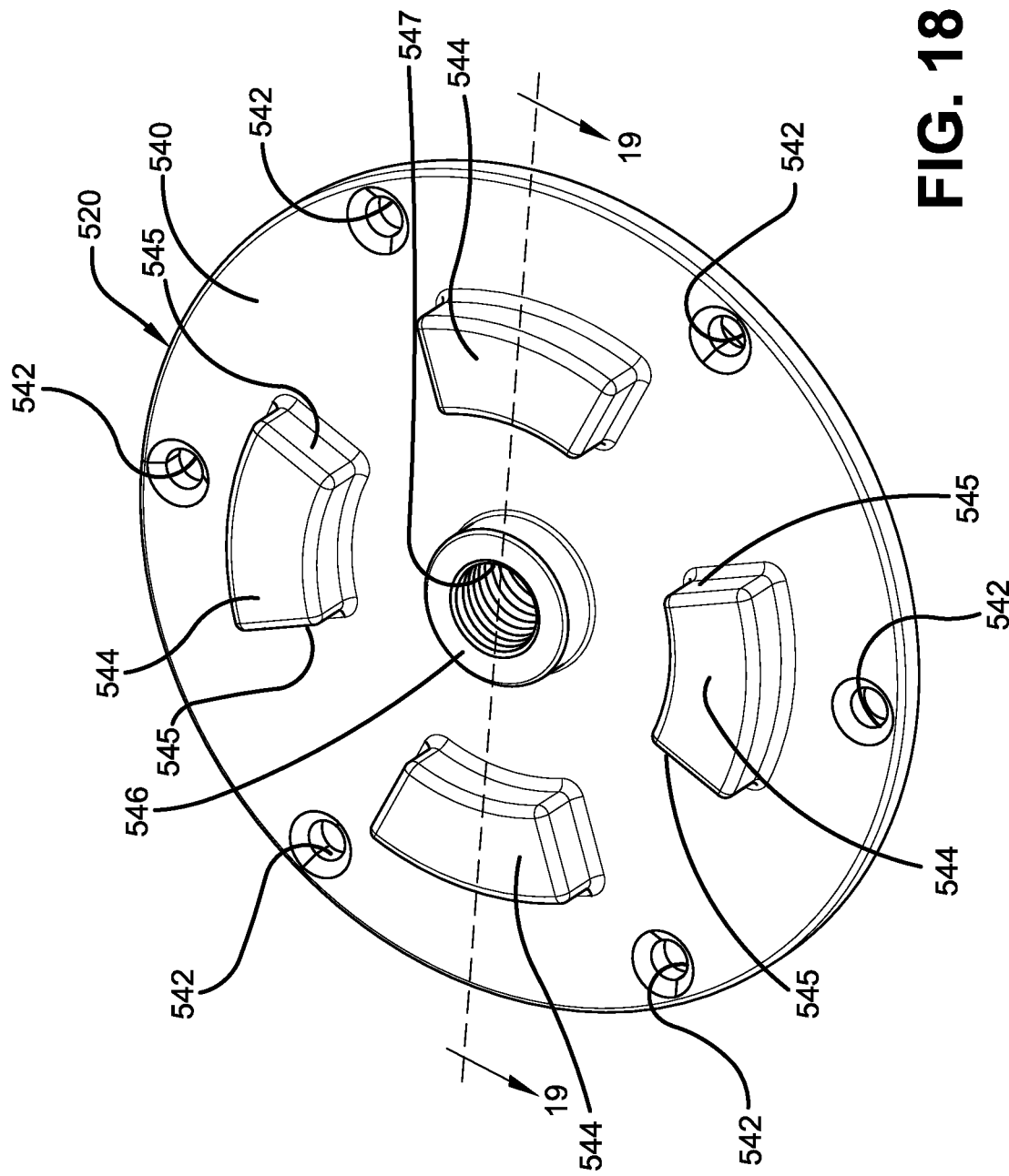
FIG. 18 is a perspective view of a hub odometer mounting structure of the outboard portion of the second alternative exemplary embodiment hubcap shown in FIG. 16.
Figure 19:
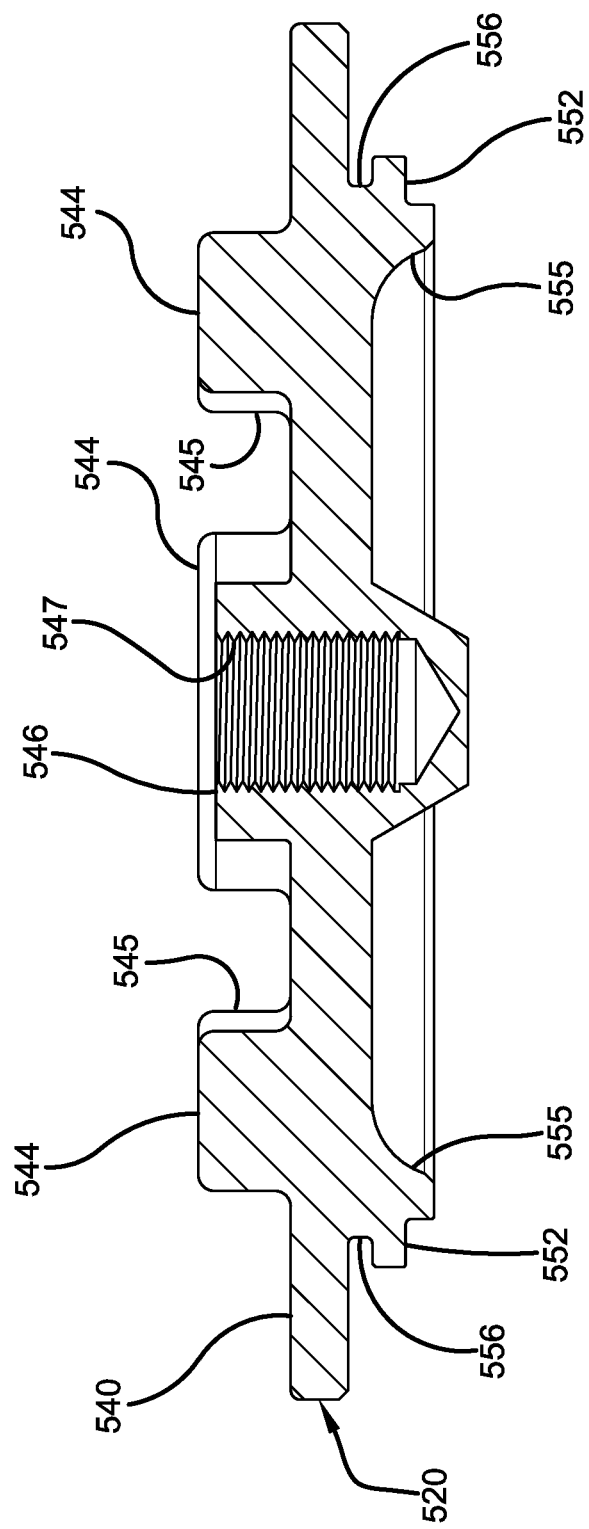
FIG. 19 is a cross-sectional view of the hub odometer mounting structure shown in FIG. 18, taken along line 19-19.

A second alternative exemplary embodiment hubcap for a heavy-duty vehicle of the disclosed subject matter is shown in FIGS. 16-19 and is indicated generally at 500. Second alternative exemplary embodiment hubcap 500 is generally similar in structure and function to first alternative exemplary embodiment hubcap 400, except that the second alternative exemplary embodiment hubcap includes structure for mounting a hub odometer, such as hub odometer 490, different than that of the first alternative exemplary embodiment hubcap, as will be described in detail below. With reference to FIGS. 16-19, hubcap 500 generally includes an inboard portion or base portion 510 (FIGS. 16-17) and an outboard portion 520 (FIGS. 16 and 18-19). With reference to FIGS. 16-17, inboard portion 510 is formed of a sturdy material, such as cast aluminum, cast steel, or composite. Inboard portion 510 is preferably formed of die cast aluminum or a plastic composite. Inboard portion 510 includes a generally cylindrical side wall 512. Inboard portion 510 also includes a frustoconical transition portion 514 integrally formed with and extending outboardly from side wall 512. With reference to FIGS. 16-17, inboard portion 510 further includes a mounting ring 516 integrally formed with the outboard end of transition portion 514. With reference to FIG. 17, mounting ring 516 is formed with a plurality of circumferentially spaced openings 517 disposed about the outboard end of the mounting ring, which enable attachment of outboard portion 520 of hubcap 500 to inboard portion 510, as will be described in detail below.

With continued reference to FIG. 17, a component mounting block 522 is integrally formed with mounting ring 516 radially inwardly of the mounting ring. Component mounting block 522 enables mounting of components of a tire inflation system, such as a rotary union (not shown). With reference to FIGS. 16-17, one or more tire inflation system valve bosses 511 are integrally formed with side wall 512, transition portion 514, and mounting ring 516. Each one of tire inflation system valve bosses 511 is formed with a respective opening 515 for accommodating attachment of a tire inflation system valve (not shown). It is to be understood that hubcap 500 could be utilized with wheel end assemblies that do not employ tire inflation systems without affecting the overall concept or operation of the disclosed subject matter. In such instances, hubcap 500 could be formed without tire inflation system valve bosses 511 and/or component mounting block 522 without affecting the overall concept or operation of the disclosed subject matter.

It is also to be understood that inboard portion 510 could have different constructions than that shown and described without affecting the overall concept or operation of the disclosed subject matter. For example, inboard portion 510 could include a construction in which side wall 512 is formed with or connected to mounting ring 516 without a transition portion, such as transition portion 514, without affecting the overall concept or operation of the disclosed subject matter. It is further contemplated that side wall 512, transition portion 514, and mounting ring 516 of inboard portion 510 could have different shapes and constructions than those shown and described without affecting the overall concept or operation of the disclosed subject matter.

With reference to FIGS. 16 and 18-19, outboard portion 520 of second alternative exemplary embodiment hubcap 500 is formed of a lightweight rigid material, such as aluminum or composite, and includes a generally disc-shaped base plate 540. Base plate 540 is formed with a plurality of openings 542 (FIGS. 16 and 18) circumferentially spaced adjacent the radially outward edge of the base plate. Each one of plurality of openings 542 aligns with a respective opening 517 (FIG. 17) formed in mounting ring 516 of inboard portion 510. Base plate 540 includes a plurality of curved bosses 544 integrally formed with and circumferentially arrayed about the outboard surface of the base plate, the purpose of which will be described in detail below. With reference to FIGS. 16 and 18-19, base plate 540 further includes a central boss 546 integrally formed with and extending axially inboardly and axially outboardly from the base plate. As is best shown in FIG. 19, central boss 546 extends outboardly from base plate 540 a distance that is less than the distance each curved boss 544 extends outboardly from the base plate, the importance of which will be described below. Central boss 546 extends inboardly from base plate 540 a distance that provides sufficient clearance for components of a tire inflation system positioned between component mounting block 522 of inboard portion 510 of hubcap 500 and the base plate when outboard portion 520 is attached to the base portion, as will be described in detail below. Central boss 546 is formed with a threaded socket 547 extending inboardly into the central boss, the importance of which will also be described in detail below.

With reference to FIG. 19, base plate 540 of outboard portion 520 includes a circumferentially extending seating structure 555 integrally formed with the inboard side of the base plate. Seating structure 555 is formed with a circumferentially extending notch 552 in which an O-ring (not shown), similar to O-ring 454 of first alternative exemplary embodiment hubcap 400, is disposed. The O-ring provides sealing between seating structure 555 of base plate 540 and mounting ring 516 of inboard portion 510. Base plate 540 further includes a recess 556, which extends radially inwardly between seating structure 555 and the inboard surface of the base plate. A ring-shaped gasket (not shown), similar to gasket 427 of first alternative exemplary embodiment hubcap 400, is disposed within recess 556 and extends radially outwardly to the radial outward edge of base plate 540. The gasket is formed with a plurality of openings (not shown) spaced circumferentially about the gasket. Each one of the plurality of openings of the gasket aligns with a respective one of plurality of openings 542 of base plate 540 and openings 517 of mounting ring 516 of inboard portion 510. A screw (not shown) or other suitable fastener is disposed through each respective aligned one of plurality of openings 542 of base plate 540, the plurality of openings of the gasket disposed within recess 556 of the base plate, and openings 517 of mounting ring 516, and threadably engages the mounting ring opening to secure outboard portion 520 to inboard portion 510. Together, the O-ring disposed in notch 552 and the gasket disposed within recess 556 of base plate 540 provide sealing between the base plate and mounting ring 516, and thus inboard portion 510 and outboard portion 520, to prevent contaminants from entering hubcap 500 and/or lubricant from escaping the hubcap between the inboard portion and the outboard portion. It is to be understood that base plate 540 could be formed without recess 556 without affecting the overall concept or operation of the disclosed subject matter, such as when the gasket employed is a paper gasket. In such instances the gasket extends radially outwardly from the radial outward edge of seating structure 555 to the radial outward edge of base plate 540.

With reference to FIGS. 16-17, inboard portion 510 of second alternative exemplary embodiment hubcap 500 includes a plurality of elongated bosses 570. Plurality of elongated bosses 570 are integrally formed with and circumferentially spaced about side wall 512 of inboard portion 510. Elongated bosses 570 include a length that provides sufficient clearance for lock nut 221 of wheel end assembly 200 within an interior cavity (not shown) of inboard portion 510 of hubcap 500 when the hubcap is attached to wheel hub 201, as will be described below. Plurality of elongated bosses 570 are mounting structure that enable hubcap 500 to be removably attached to wheel hub 201. More specifically, each one of plurality of elongated bosses 570 is formed with an elongated opening 572 extending axially through the boss. Each of elongated bosses 570 corresponds to and aligns with a respective boss 235 of hub portion 202 of wheel hub 201, such that the elongated bosses and bosses of the hub portion are continuous with one another, and elongated opening 572 of the elongated boss aligns with a respective threaded opening 237 formed in the boss of the hub portion. A recess 574 is formed in transition portion 514 of inboard portion 510 adjacent each elongated boss 570, the purpose of which will be described below.

Hubcap 500 preferably includes six (6) elongated bosses 570 integrally formed with side wall 512 of inboard portion 510, but could include more or less than six bosses, such as four (4) or eight (8) bosses, so long as the elongated bosses correspond to respective ones of threaded openings 237 of hub portion 202 of wheel hub 201 and correspond with the pattern of cut-outs 273 of main central section 272 of flange portion 206 of the wheel hub, without affecting the overall concept or operation of the disclosed subject matter. Elongated bosses 570 of hubcap 500 are preferably evenly circumferentially spaced about side wall 512 of inboard portion 510. Hubcap 500 could even include an odd number of elongated bosses 570 integrally formed with side wall 512 of inboard portion 510, such as five (5) elongated bosses, so long as the elongated bosses correspond to respective ones of threaded openings 237 of hub portion 202 of wheel hub 201 and correspond with the pattern of cut-outs 273 of main central section 272 of flange portion 206 of the wheel hub, without affecting the overall concept or operation of the disclosed subject matter.

A gasket (not shown) similar to gasket 380 described above is disposed between the inboard end of inboard portion 510 of second alternative exemplary embodiment hubcap 500 and the outboard end of hub portion 202 of wheel hub 201. The shape of the gasket substantially corresponds to the shape of the inboard end of inboard portion 510 of hubcap 500 and the outboard end of hub portion 202 of wheel hub 201. A plurality of openings (not shown) circumferentially spaced about the gasket align axially with elongated openings 572 of elongated bosses 570 and threaded openings 237 of hub portion 202 of wheel hub 201. A bolt (not shown), or other suitable fastener, is disposed through each axially aligned elongated opening 572 and the gasket opening, and threadably engages a respective threaded opening 237 formed in boss 235 of hub portion 202 of wheel hub 201 to removably secure hubcap 500 to the wheel hub. Recesses 574 formed in transition portion 514 of inboard portion 510 adjacent respective elongated bosses 570 provide sufficient clearance for a tool, such as a ratchet, to enable tightening of the respective bolts. Once hubcap 500 is removably secured to wheel hub 201 in the manner described above, the gasket provides sealing between the hubcap and the wheel hub.

Second alternative exemplary embodiment hubcap 500 of the disclosed subject matter provides the same advantages as those described with regard to exemplary embodiment hubcap 300 and first alternative exemplary embodiment hubcap 400 described above in that it provides increased and more uniform clamping force between the hubcap and a wheel hub, thereby providing a better, more uniform seal between the hubcap and the wheel hub to prevent or minimize leakage of lubricant from the wheel end assembly and/or entry of contaminants into the wheel end assembly. Like exemplary embodiment hubcap 300 and first alternative exemplary embodiment hubcap 400, hubcap 500 also provides clearance for removal of an outboard mounted disc brake rotor in heavy-duty vehicle wheel end assemblies that include outboard mounted disc brake rotor configurations without requiring the hubcap to be removed prior to removing the outboard mounted disc brake rotor.

In addition, like first alternative exemplary embodiment hubcap 400, second alternative exemplary embodiment hubcap 500 includes structure that enables mounting of a hub odometer (not shown), such as hub odometer 490 (FIGS. 12-13). With reference to FIGS. 18-19, threaded socket 547 formed in central boss 546 of outboard portion 520 is adapted to receive a mounting stud (not shown) of the hub odometer, such as mounting stud 492 (FIG. 13) of hub odometer 490. More specifically, threaded socket 547 is sized such that the mounting stud of the hub odometer can threadably engage the threaded socket to secure the hub odometer to outboard portion 520 via simple tightening means until the inboard surface of the hub odometer contacts the outboard surfaces of curved bosses 544 (FIGS. 16 and 18-19) of base plate 540, which in turn provide mounting support to the hub odometer once secured. Because curved bosses 544 are circumferentially spaced about base plate 540 and extend annularly thereon, they provide a consistent diameter for the inboard surface of the hub odometer to react against when secured to outboard portion 520. This in turn provides consistent frictional force between the outboard surfaces of curved bosses 544 and the inboard surface of the hub odometer, to resist potential loosening of the threaded connection between the hub odometer mounting stud and threaded socket 547 of central boss 546 of outboard portion 520 from road vibration experienced during operation of the heavy-duty vehicle. Moreover, because central boss 546 extends outboardly from base plate 540 a distance that is less than the distance each curved boss 544 extends outboardly from the base plate, the frictional force between the outboard surfaces of the curved bosses and the inboard surface of the hub odometer, and thus between the hub odometer and outboard portion 520, is located away from the threaded connection between the hub odometer mounting stud and threaded socket 547 of central boss 546. This in turn aides in resisting potential loosening of the threaded connection between the hub odometer mounting stud and threaded socket 547 of central boss 546 from road vibration experienced during operation of the heavy-duty vehicle.

Thus, second alternative exemplary embodiment hubcap 500 provides structure that enables simple and secure mounting of a hub odometer. In addition, if the hub odometer becomes damaged during operation of the heavy-duty vehicle, the hub odometer can be removed from base plate 540 of outboard portion 520 simply by unscrewing the hub odometer and can be replaced with a new hub odometer via threaded engagement of the new hub odometer mounting stud with threaded socket 547 of central boss 546. This replacement of the hub odometer can be done without requiring outboard portion 520 of hubcap 500 to be removed from inboard portion 510 of the hubcap, thereby preventing contaminants from possibly entering and/or lubricant from exiting the interior of the hubcap, and thus wheel end assembly 200.

Moreover, the orientation of curved bosses 544 on base plate 540 of outboard portion 520 enable drainage of water and/or other contaminants, such as road splash, from between the outboard surface of base plate 540 and the inboard surface of the hub odometer that potentially can be introduced between the base plate and hub odometer during operation of the heavy-duty vehicle. More specifically, and with reference to FIGS. 16 and 18-19, because curved bosses 544 are circumferentially arrayed about the outboard surface of base plate 540 and extend annularly thereon, radial gaps 545 exists between adjacent curved bosses. As hubcap 500 rotates during operation of heavy-duty vehicle, radial gaps 545 enable water and/or other contaminants that are introduced between the hub odometer and base plate 540 of outboard portion 520 to flow radially outwardly through the gaps and be expelled from between the hub odometer and the base plate.

It is to be understood that while base plate 540 of outboard portion 520 is shown with four (4) curved bosses 544, the base plate could have more or less than four (4) curved bosses circumferentially arrayed about the outboard surface of the base plate without affecting the overall concept or operation of the disclosed subject matter. It is also contemplated that curved bosses 544 could have other lengths and shapes than that shown without affecting the overall concept or operation of the disclosed subject matter.

Thus, in addition to providing the same or similar advantages as those provided by exemplary embodiment hubcap 300 and first alternative exemplary embodiment hubcap 400, second alternative exemplary embodiment hubcap 500 includes structure that enables simple mounting of a hub odometer to the hubcap in a manner that allows removal of an outboard mounted disc brake rotor, without removal of the hubcap and/or hub odometer, as well as includes structure that provides secure attachment of the hub odometer to the hubcap and enables drainage of water and/or other contaminants from between the hub odometer and hubcap that can potentially be introduced during operation of the heavy-duty vehicle. In addition, second exemplary embodiment hubcap 500 allows removal and replacement of the hub odometer without requiring the interior of the hubcap to be exposed, thereby preventing possible entry of contaminants into and/or exit of lubricant from the hubcap, and thus the wheel end assembly.

Exemplary embodiment hubcaps 300, 400, and 500 of the disclosed subject matter find application in all types of heavy-duty wheel end assemblies known to those skilled in the art, including other types of wheel end assemblies than those shown and described herein, without affecting the concept or operation of the disclosed subject matter. It is to be understood that while hubcaps 300, 400, and 500 of the disclosed subject matter are shown and/or described as being utilized with wheel hub 201, which accommodates mounting of an outboard mounted disc brake rotor, the hubcaps find application with wheel hubs that do not accommodate mounting of outboard mounted rotors, such as disc brake rotor 22 described above. It is also contemplated that hubcaps 300, 400, and 500 of the disclosed subject matter could be utilized with wheel hub structures other than those shown and described, including those with different boss arrangements and structures for mounting a hubcap to the wheel hub without affecting the overall concept or operation of the disclosed subject matter. Furthermore, hubcaps 300, 400, and 500 could include different configurations, structures, and/or materials than those shown and described without affecting the overall concept or operation of the disclosed subject matter. For example, inboard portion 310, outboard portion 320, and outboard wall 350 of hubcap 300, inboard portion 410 and outboard portion 420 of hubcap 400, and/or inboard portion 510 and outboard portion 520 of hubcap 500 could be integrally formed as respective one-piece structures, such as one-piece aluminum die cast structures. It is also to be understood that hubcaps 300, 400, and 500 of the disclosed subject matter could be utilized with wheel end assemblies that do not incorporate tire inflation systems, or components thereof, without affecting the overall concept or operation of the disclosed subject matter.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the disclosed subject matter has been described with reference to specific embodiments. It shall be understood that these illustrations are by way of example and not by way of limitation, as the scope of the disclosed subject matter is not limited to the exact details shown or described. Potential modifications and alterations will occur to others upon a reading and understanding of this disclosure, and it is understood that the disclosed subject matter includes all such modifications and alterations and equivalents thereof.

Having now described the features, discoveries and principles of the hubcap for a heavy-duty vehicle of the disclosed subject matter, the manner in which the hubcap is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. A hubcap for a heavy-duty vehicle comprising:
   an inboard portion including
      a side wall, said side wall forming an interior cavity in said inboard portion; and
      at least one mounting structure, said at least one mounting structure including an elongated opening through which a fastener is disposed for mounting the inboard portion to a wheel hub of said heavy-duty vehicle, the at least one mounting structure cooperating with said side wall to provide non-cantilevered connection of said hubcap to said wheel hub; and
   an outboard portion, said outboard portion sealing an outboard end of the hubcap, said at least one mounting structure and said fastener being disposed inboard of the outboard portion.

2. The hubcap for a heavy-duty vehicle of claim 1, wherein said at least one mounting structure includes at least two elongated bosses, said elongated bosses being circumferentially spaced about said side wall, each one of the elongated bosses including a respective one of said elongated opening through which a respective one of said fastener is disposed to provide said non-cantilevered connection of said hubcap to an outboard end of said wheel hub.

3. The hubcap for a heavy-duty vehicle of claim 2, further comprising a gasket, said gasket having a shape that substantially corresponds to an inboard end of said inboard portion, the gasket being disposed between said inboard end and said outboard end of said wheel hub, said non-cantilevered connection providing substantially uniform clamping force on said gasket to provide a seal between said hubcap and the wheel hub.

4. The hubcap for a heavy-duty vehicle of claim 3, wherein said side wall extends between adjacent elongated openings of said elongated bosses substantially within an outer line and an inner line extending tangential to and between the adjacent elongated openings to provide said substantially uniform clamping force.

5. The hubcap for a heavy-duty vehicle of claim 4, wherein a radially inner edge of said side wall is adjacent to a line extending between center points of said adjacent openings of said elongated bosses to provide said substantially uniform clamping force.

6. The hubcap for a heavy-duty vehicle of claim 2, wherein said elongated bosses are integrally formed with said side wall.

7. The hubcap for a heavy-duty vehicle of claim 2, wherein said elongated bosses are circumferentially spaced evenly from one another about said side wall.

8. The hubcap for a heavy-duty vehicle of claim 2, wherein said elongated bosses have a length of at least 1 inch.

9. The hubcap for a heavy-duty vehicle of claim 2, wherein said at least one mounting structure includes six elongated bosses circumferentially spaced about said side wall.

10. The hubcap for a heavy-duty vehicle of claim 1, wherein said side wall is cylindrical.

11. The hubcap for a heavy-duty vehicle of claim 1, wherein said hubcap is formed of is aluminum, cast steel, or composite.

12. The hubcap for a heavy-duty vehicle of claim 2, wherein said inboard portion further includes a frustoconical transition portion between said side wall and said outboard portion.

13. The hubcap for a heavy-duty vehicle of claim 12, wherein said frustoconical transition portion includes one or more recesses adjacent one or more of said elongated bosses.

14. The hubcap for a heavy-duty vehicle of claim 2, wherein each of said elongated bosses corresponds to and aligns with a respective boss of said wheel hub, the elongated bosses and respective bosses of said wheel hub having continuous profiles.

15. The hubcap for a heavy-duty vehicle of claim 14, wherein said continuous profiles of said elongated bosses and respective bosses of said wheel hub correspond to cut-outs formed in an outboard mounted disc brake rotor, the continuous profiles provide sufficient clearance for removal of said outboard mounted disc brake rotor.

16. The hubcap for a heavy-duty vehicle of claim 14, wherein said bosses of said wheel hub include threaded openings for receiving said fasteners, said threaded openings providing at least 0.410 inch of thread engagement.

17. The hubcap for a heavy-duty vehicle of claim 1, wherein said outboard portion includes a hub odometer mounting structure for mounting a hub odometer.

18. The hubcap for a heavy-duty vehicle of claim 17, wherein said hub odometer mounting structure is a boss with a threaded socket, a mounting stud of said hub odometer threadably engaging said threaded socket to secure the hub odometer to the outboard portion.

19. The hubcap for a heavy-duty vehicle of claim 18, wherein said outboard portion further includes a plurality of support ribs on an outboard surface of the outboard portion, said plurality of support ribs providing mounting support to said hub odometer.

20. The hubcap for a heavy-duty vehicle of claim 19, wherein said boss extends outboardly from said outboard portion a distance that is less than a distance each one of said plurality of support ribs extends from the outboard portion.

21. The hubcap for a heavy-duty vehicle of claim 18, wherein said outboard portion further includes a plurality of curved bosses circumferentially arrayed on an outboard surface of the outboard portion, said curved bosses providing mounting support to said hub odometer and enabling radial outward flow of water and contaminants through spaces between the curved bosses during operation of said heavy-duty vehicle.

22. The hubcap for a heavy-duty vehicle of claim 21, wherein said boss extends outboardly from said outboard portion a distance that is less than a distance each one of said plurality of curved bosses extends from the outboard portion.

23. The hubcap for a heavy-duty vehicle of claim 1, wherein said side wall is tapered.

24. A hubcap for a heavy-duty vehicle comprising:
an inboard portion including
  a side wall, said side wall forming an interior cavity in said inboard portion;
  at least one mounting structure for mounting said hubcap to a wheel hub of said heavy-duty vehicle, said at least one mounting structure cooperating with the side wall to provide non-cantilevered connection to said wheel hub, wherein said side wall extends between adjacent openings of the at least one mounting structure substantially within an outer line and an inner line extending tangential to and between said adjacent openings, a radially inner edge of the side wall being adjacent to a line extending between center points of the adjacent openings to provide substantially uniform clamping force between said hubcap and the wheel hub; and
  at least one recess adjacent the at least one mounting structure, said at least one recess providing clearance for tightening fasteners disposed through the adjacent openings; and
an outboard portion, said outboard portion sealing the outboard end of the hubcap.

25. A hubcap for a heavy-duty vehicle comprising:
an inboard portion including
  a side wall, said side wall forming an interior cavity in said inboard portion; and
  at least one mounting structure for mounting said hubcap to a wheel hub of said heavy-duty vehicle, said at least one mounting structure cooperating with said side wall to provide non-cantilevered connection to said wheel hub; and
an outboard portion, said outboard portion sealing an outboard end of the hubcap, the outboard portion including:
  a hub odometer mounting structure, said hub odometer mounting structure including a boss with a threaded socket, a mounting stud of a hub odometer threadably engaging said threaded socket to secure said hub odometer to said outboard portion; and
  a plurality of support ribs on an outboard surface of the outboard portion, said plurality of support ribs providing mounting support to the hub odometer.

26. A hubcap for a heavy-duty vehicle comprising:
an inboard portion including
  a side wall, said side wall forming an interior cavity in said inboard portion; and
  at least one mounting structure for mounting said hubcap to a wheel hub of said heavy-duty vehicle, said at least one mounting structure cooperating with said side wall to provide non-cantilevered connection to said wheel hub; and
an outboard portion, said outboard portion sealing the outboard end of the hubcap, the outboard portion including:
  a hub odometer mounting structure, said hub odometer mounting structure including a boss with a threaded socket, a mounting stud of a hub odometer threadably engaging said threaded socket to secure said hub odometer to said outboard portion; and
  a plurality of curved bosses circumferentially arrayed on an outboard surface of the outboard portion, said curved bosses providing mounting support to said hub odometer and enabling radial outward flow of water and contaminants through spaces between the curved bosses during operation of said heavy-duty vehicle.

\* \* \* \* \*